(12) United States Patent
Onuki et al.

(10) Patent No.: US 10,110,835 B2
(45) Date of Patent: Oct. 23, 2018

(54) IMAGING APPARATUS, IMAGING SYSTEM, AND MOVING OBJECT

(71) Applicant: CANON KABUSHIKI KAISHA, Tokyo (JP)

(72) Inventors: Yusuke Onuki, Fujisawa (JP); Masahiro Kobayashi, Tokyo (JP); Kazunari Kawabata, Mitaka (JP); Hiroshi Sekine, Kawagoe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/611,650

(22) Filed: Jun. 1, 2017

(65) Prior Publication Data

US 2017/0353675 A1 Dec. 7, 2017

(30) Foreign Application Priority Data

Jun. 6, 2016 (JP) ................................ 2016-112839

(51) Int. Cl.
| | |
|---|---|
| H04N 5/374 | (2011.01) |
| H04N 5/355 | (2011.01) |
| H04N 5/3745 | (2011.01) |
| H04N 5/376 | (2011.01) |
| H04N 13/04 | (2006.01) |

(52) U.S. Cl.
CPC ....... *H04N 5/3559* (2013.01); *H04N 5/35581* (2013.01); *H04N 5/3745* (2013.01); *H04N 5/3765* (2013.01); *H04N 5/37452* (2013.01); *H04N 5/37457* (2013.01); *H04N 13/0425* (2013.01)

(58) Field of Classification Search
CPC ............. H04N 5/3559; H04N 13/0425; H04N 5/37457; H04N 5/37452; H04N 5/35581; H04N 5/3745; H04N 5/3765
See application file for complete search history.

(56) References Cited

U.S. PATENT DOCUMENTS

| | | | |
|---|---|---|---|
| 6,317,154 B2* | 11/2001 | Beiley | H01L 27/14609 348/308 |
| 6,850,278 B1 | 2/2005 | Sakurai et al. | |
| 7,286,174 B1* | 10/2007 | Weale | H04N 5/335 250/208.1 |
| 9,118,883 B2* | 8/2015 | Wan | H04N 5/765 |
| 9,756,271 B2* | 9/2017 | Luo | H04N 5/37452 |
| 9,936,153 B1* | 4/2018 | Mao | H04N 5/378 |
| 2014/0339396 A1 | 11/2014 | Nam | |

FOREIGN PATENT DOCUMENTS

| | | |
|---|---|---|
| EP | 2362642 A1 | 8/2011 |
| EP | 2541896 A1 | 1/2013 |
| JP | 2006-246450 A | 9/2006 |

* cited by examiner

*Primary Examiner* — Hung Lam
(74) *Attorney, Agent, or Firm* — Canon USA, Inc. I.P. Division

(57) ABSTRACT

An imaging apparatus includes a plurality of groups one of a part of which has a capacitance changing unit configured to change a capacitance value of an input node.

20 Claims, 15 Drawing Sheets

IMAGING APPARATUS, IMAGING SYSTEM, AND MOVING OBJECT

BACKGROUND OF THE INVENTION

Field of the Invention

The present invention relates to an imaging apparatus, an imaging system and a moving object.

Description of the Related Art

An imaging apparatus has been known which includes a plurality of unit cells arranged across a plurality of rows and a plurality of columns.

An imaging apparatus has been proposed which applies a global electronic shutter function for controlling a start of exposure and a completion of exposure synchronously through an electronic shutter in unit cells of a plurality of rows.

Japanese Patent Laid-Open No. 2006-246450 discloses an imaging apparatus with a global electronic shutter function, and the imaging apparatus includes pixels each having a photoelectric converting unit, a floating diffusion capacitance, and a plurality of signal holding units.

In the imaging apparatus according to Japanese Patent Laid-Open No. 2006-246450, an electrical path between one of the plurality of signal holding units and the photoelectric converting unit may have a higher impedance while an electrical path between the other one of the plurality of signal holding units and the photoelectric converting unit may have a lower impedance. Thus, a signal having a lower sensitivity is held in the signal holding unit having a higher impedance while a signal having a higher sensitivity is held in the signal holding unit having a lower impedance. Use of the signal having a lower sensitivity held in one of the plurality of signal holding units and the signal having a higher sensitivity held in the other one of the plurality of signal holding units results in an image having a dynamic range that can be extended.

SUMMARY OF THE INVENTION

According to an aspect of the present invention, an imaging apparatus includes a cell array having a plurality of groups arranged across a plurality of rows and a plurality of columns, each of the groups including a photoelectric converting unit, a signal holding unit, an amplifying unit having an input node, a first transfer unit having an electrical path between the photoelectric converting unit and the signal holding unit, and a second transfer unit having an electrical path between the signal holding unit and the input node, and a control unit configured to control the plurality of groups. In this case, the control unit is configured to synchronize the plurality of groups to start and to complete a transfer of a signal from the photoelectric converting unit to the signal holding unit performed by the first transfer unit, and at least one of the plurality of groups further has a capacitance changing unit configured to change a capacitance value of the input node therein.

According to another aspect of the present invention, an imaging apparatus includes a cell array having a plurality of groups arranged across a plurality of rows and a plurality of columns, each of the groups including a photoelectric converting unit, a signal holding unit, a first amplifying unit having a first input node having a first capacitance value, a second amplifying unit having a second input node having a second capacitance value higher than the first capacitance value, a first transfer unit provided on an electrical path between the photoelectric converting unit and the signal holding unit, a second transfer unit provided on an electrical path between the signal holding unit and the first input node, and a third transfer unit provided on an electrical path between the signal holding unit and the second input node, and a control unit configured to synchronize the plurality of groups to start and to complete a transfer of a signal from the photoelectric converting unit to the signal holding unit performed by the first transfer unit.

According to another aspect of the present invention, an imaging apparatus includes a cell array having a plurality of groups arranged across a plurality of rows and a plurality of columns, and each of the groups includes a photoelectric converting unit, a signal holding unit, an amplifying unit having an input node, a first transfer unit provided on an electrical path between the photoelectric converting unit and the signal holding unit, a second transfer unit, a second signal holding unit, a third transfer unit provided on an electrical path between the photoelectric converting unit and the second signal holding unit, and a fourth transfer unit. In this case, the first transfer unit completes a transfer of a signal from the photoelectric converting unit to the signal holding unit at an equal time point in the plurality of groups. The input node of a first group of the plurality of groups has a first capacitance value. The input node of a second group of the plurality of groups has a second capacitance value higher than the first capacitance value. The second transfer unit in the first group and the second transfer unit in the second group are connected to the input node of one of the first group and the second group. The fourth transfer unit in the first group and the fourth transfer unit in the second group are connected to the input node of the other one of the first group and the second group.

Further features of the present invention will become apparent from the following description of embodiments with reference to the attached drawings.

DESCRIPTION OF THE EMBODIMENTS

Japanese Patent Laid-Open No. 2006-246450 does not examine a relationship between extension of a dynamic range of an image to be implemented in an imaging apparatus applying a global electronic shutter function and capacitance value of an input node of an amplifying unit configured to output a signal based on a signal generated by a photoelectric converting unit to outside of a unit cell.

The following technology examines a relationship between extension of a dynamic range of an image to be implemented in an imaging apparatus applying a global electronic shutter function and capacitance value of an input node of an amplifying unit configured to output a signal based on a signal generated by a photoelectric converting unit to outside of a unit cell.

With reference to drawings, embodiments will be described below. Each of the embodiments of the present invention described below can be implemented solely or as a combination of a plurality of the embodiments or a combination of features thereof where necessary or where the combination of elements or features from individual embodiments in a single embodiment is beneficial.

The following description may assume that a signal contains a noise component, for example. In the following descriptions, a noise component contained in a signal may be called an N component. A component acquired by subtracting the N component from a signal may be called an S component.

First Embodiment

Configuration of Imaging Apparatus

Figure 1:
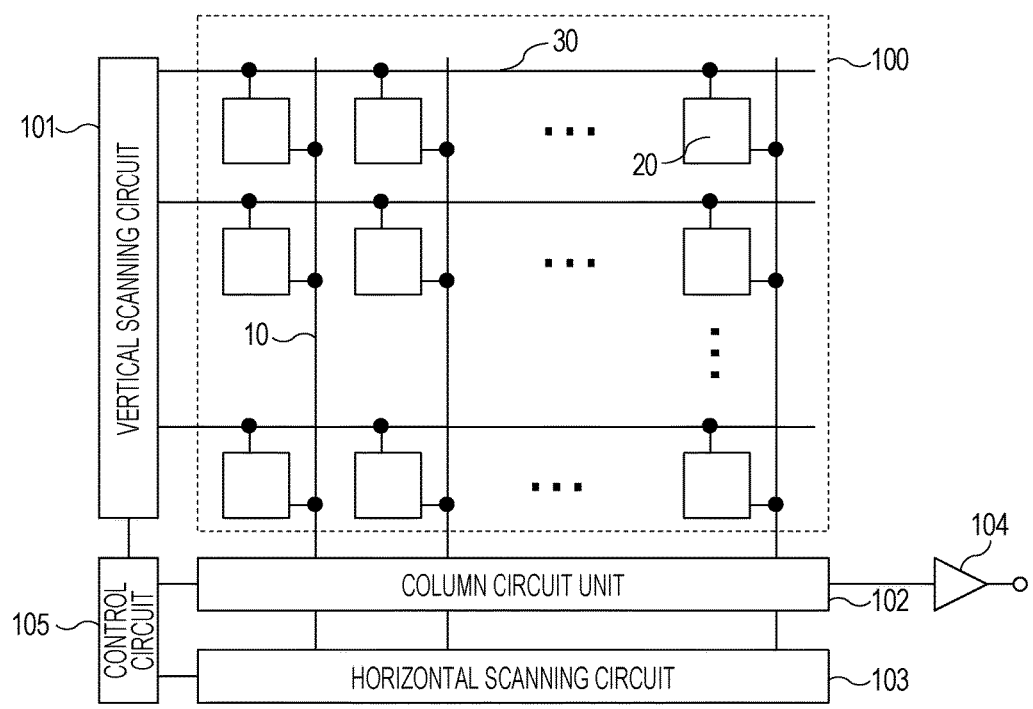
FIG. 1 illustrates a configuration of an imaging apparatus.

FIG. 1 illustrates an imaging apparatus according to a first embodiment. The imaging apparatus according to this embodiment includes column signal lines 10 and unit cells 20. The unit cells 20 are arranged across a plurality of rows and a plurality of columns in a cell array 100. The column signal lines 10 are arranged correspondingly to columns having the unit cells 20. The imaging apparatus further includes a vertical scanning circuit 101. The unit cells 201 of one row and the vertical scanning circuit 101 are connected through a control line 30 such that a common signal can be supplied from the vertical scanning circuit 101 to the unit cells 20 of the row. The vertical scanning circuit 101 corresponds to a control unit configured to control accumulation periods in the unit cells 20.

The imaging apparatus further includes a column circuit unit 102, a horizontal scanning circuit 103, and an output circuit 104. The column circuit unit 102 has a plurality of column circuits. Each of the plurality of column circuits is arranged for a corresponding one of the plurality of column signal lines 10. Each of the plurality of column circuits is configured to output a signal acquired by amplifying a signal output to the corresponding column signal line 10 to an output circuit 104.

The horizontal scanning circuit 103 is configured to sequentially select a plurality of column circuits included in the column circuit unit 102. Thus, signals held in the plurality of column circuits can be sequentially output to the output circuit 104. The output circuit 104 is configured to output a signal to outside of the imaging apparatus. The signals output from the output circuit 104 correspond to signals output from the imaging apparatus.

The imaging apparatus further includes a control circuit 105. The control circuit 105 is connected to the vertical scanning circuit 101, the column circuit unit 102, and the horizontal scanning circuit 103 through drive lines configured to supply drive signals.

Configuration of Unit Cell

Figure 2:
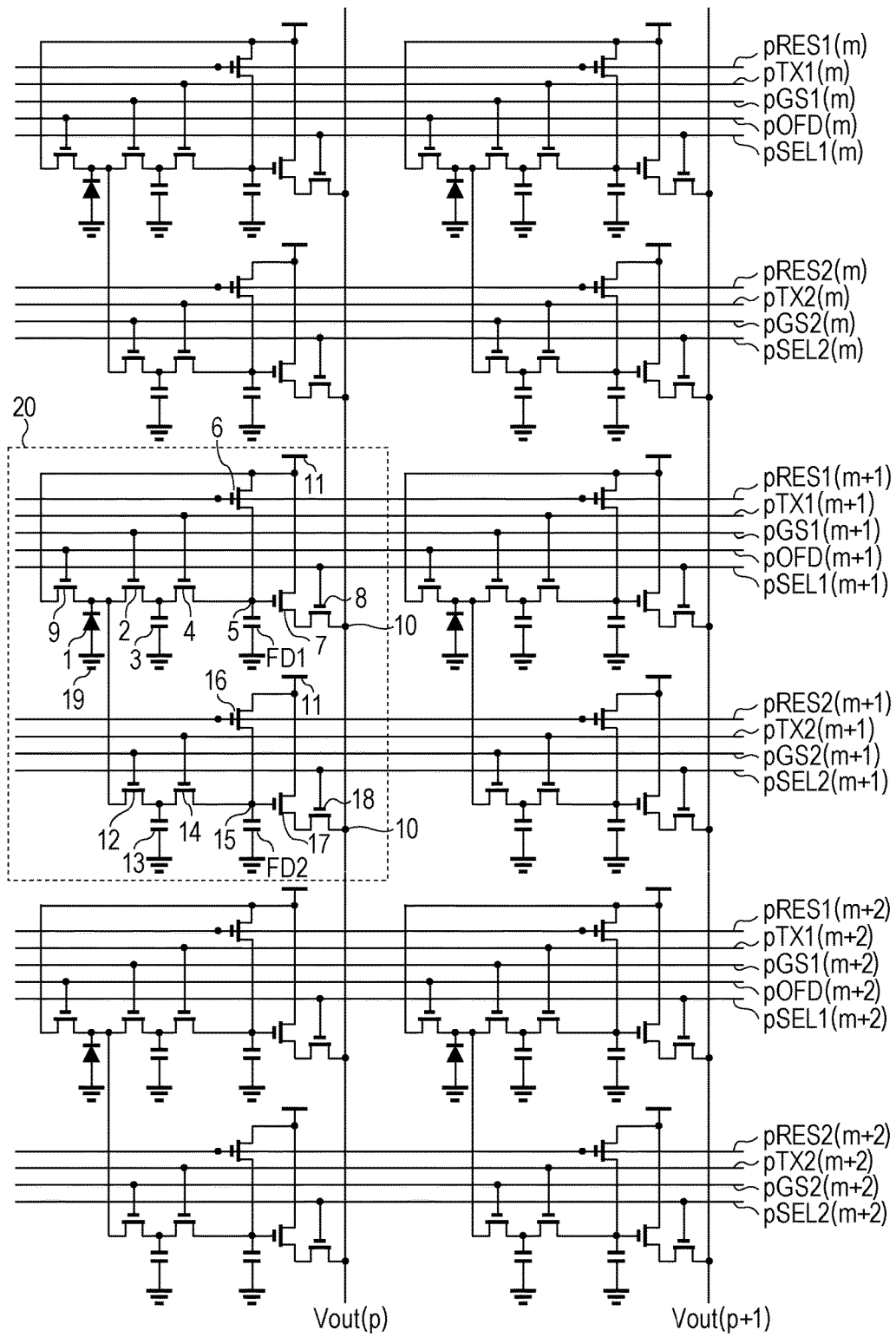
FIG. 2 illustrates a configuration of unit cells.

FIG. 2 illustrates details of a configuration of the unit cells 20. Each of the unit cells 20 has one photodiode 1. The photodiode 1 is a photoelectric converting unit configured to generate a signal corresponding to incident light. The photodiode 1 is connected to a ground line 19. Each of the unit cells 20 further has a first transfer switch 2, a second transfer switch 4, a third transfer switch 12, and a fourth transfer switch 14. Each of the unit cells 20 further has a first capacitor element 3, and a second capacitor element 13. Here, the first capacitor element 3 has a capacitance value equal to a capacitance value of the second capacitor element 13.

The photodiode 1 and the first capacitor element 3 are electrically connected through the first transfer switch 2. The photodiode 1 and the second capacitor element 13 are electrically connected through the third transfer switch 12.

Each of the unit cells 20 further has a first amplifying unit 7, a second amplifying unit 17, a first selection switch 8, and a second selection switch 18. A first floating diffusion capacitance FD1 is connected to a first input node 5 being an input node of the first amplifying unit 7. A second floating diffusion capacitance FD2 is connected to a second input node 15 being an input node of the second amplifying unit 17. The second floating diffusion capacitance FD2 has a capacitance value higher than a capacitance value of the first floating diffusion capacitance FD1. Each of the first floating diffusion capacitance FD1 and the second floating diffusion capacitance FD2 is a floating diffusion unit formed by diffusing an impurity into a silicon semiconductor layer. The capacitance values of the first input node 5 and the second input node 15 can be differentiated by a difference between capacitance values of the first floating diffusion capacitance FD1 and the second floating diffusion capacitance FD2.

The first capacitor element 3 and the first floating diffusion capacitance FD1 are electrically connected through the second transfer switch 4. The second capacitor element 13 and the second floating diffusion capacitance FD2 are electrically connected through the fourth switch 14.

The first amplifying unit 7 and the column signal line 10 are electrically connected through the first selection switch 8. The second amplifying unit 17 and the column signal line 10 are electrically connected through the second selection switch 18. Power supply voltage 11 is supplied to both of the first amplifying unit 7 and the second amplifying unit 17.

A current source, not illustrated, is electrically connected to the column signal lines 10. When the first selection switch 8 has an ON state, the first amplifying unit 7, the power supply voltage 11, and the current source electrically connected to the column signal lines 10 configure a source follower circuit. When the second selection switch 18 has an ON state, the second amplifying unit 17, the power supply voltage 11, and the current source electrically connected to the column signal lines 10 configure a source follower circuit. Referring to FIG. 2, a signal output to the column signal lines 10 is represented by signal Vout(p). (p) given at the end indicates a column number.

Each of the unit cells 20 further has a first reset switch 6 and a second reset switch 16. The power supply voltage 11 is supplied to both of the first reset switch 6 and the second reset switch 16. The first reset switch 6 is connected to the first input node 5. The second reset switch 16 is connected to the second input node 15.

Each of the unit cells 20 further has a PD reset switch 9. The power supply voltage 11 is supplied to the PD reset switch 9.

According to this embodiment, the first transfer switch 2 corresponds to a first transfer unit configured to transfer a signal from the photodiode 1 being a photoelectric converting unit to the first capacitor element 3 being one of the signal holding units. The second transfer switch 4 corresponds to a second transfer unit configured to transfer a signal from the first capacitor element 3 being one of the signal holding units to the first input node 5. The fourth transfer switch 14 corresponds to a third transfer unit configured to transfer a signal from the second capacitor element 13 being another one of the signal holding units to the second input node 15.

According to this embodiment, one unit cell 20 corresponds to one group having the photoelectric converting unit, the first transfer unit, the second transfer unit, the third transfer unit, the fourth transfer unit, the first signal holding unit, the second signal holding unit, the first amplifying unit, and the second amplifying unit.

Referring to FIG. 1, the unit cells 20 and the vertical scanning circuit 101 are electrically connected through the control lines 30. The first transfer switch 2 has a gate configured to receive a signal pGS1($m$). Hereinafter, "(m)" given at the ends of references of signals to be input to the unit cells 20 indicates that the signals are to be input to the unit cells 20 of an mth row. Signals input to unit cells 20 of a plurality of rows are collectively indicated by a reference without "(m)".

The second transfer switch 4 has a gate configured to receive a signal pTX(m). The third transfer switch 12 has a gate configured to receive a signal pGS2($m$). The fourth transfer switch 14 has a gate configured to receive a signal pTX2($m$).

The PD reset switch 9 has a gate configured to receive a signal pOFD(m).

The signals pGS1 input to the unit cells 20 of a plurality of rows are changed to have an active level at an equal time point and are changed to have a non-active level at an equal time point. The signals pGS2 input to the unit cells 20 of a plurality of rows are changed to have an active level at an equal time point and are changed to have a non-active level at an equal time point. The signals pOFD input to the unit cells 20 of a plurality of rows are changed to have an active level at an equal time point and are changed to have a non-active level at an equal time point. Thus, the imaging apparatus according to this embodiment may perform a global electronic shutter operation in which signal accumulation operations are started and are completed at equal time points in the photodiodes 1 of all of the unit cells 20.

The first reset switch 6 has a gate configured to receive a signal pRES1($m$). The second reset switch 16 has a gate configured to receive a signal pRES2($m$).

The first selection switch 8 has a gate configured to receive a signal pSEL1($m$). The second selection switch 18 has a gate configured to receive a signal pSEL2($m$).

Operations to be Performed in Imaging Apparatus

Next, with reference to FIGS. 3 and 4, operations to be performed in the imaging apparatus illustrated in FIGS. 1 and 2 will be described.

Figure 3:
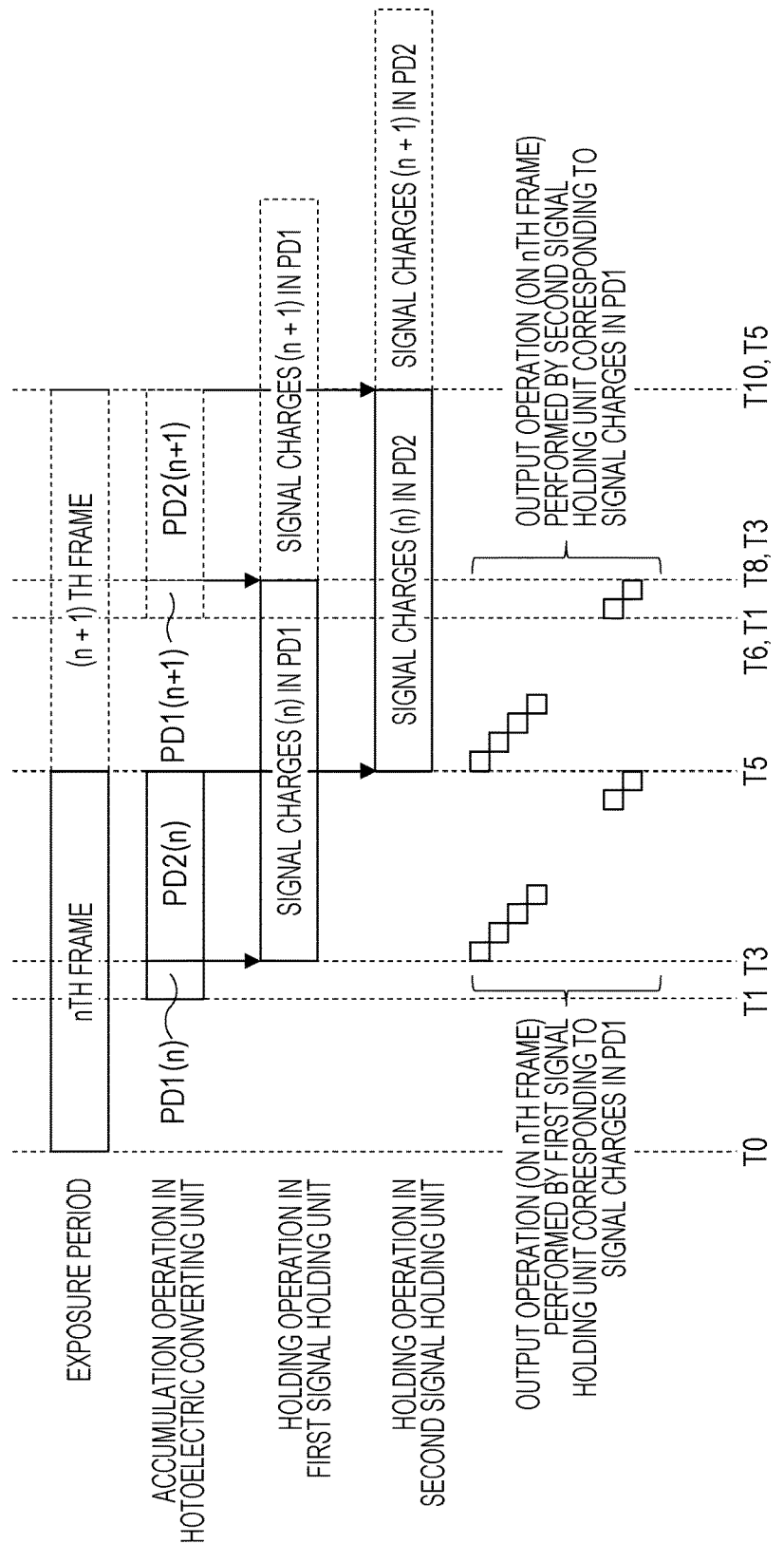
FIG. 3 illustrates operations to be performed in unit cells.
Figure 4:
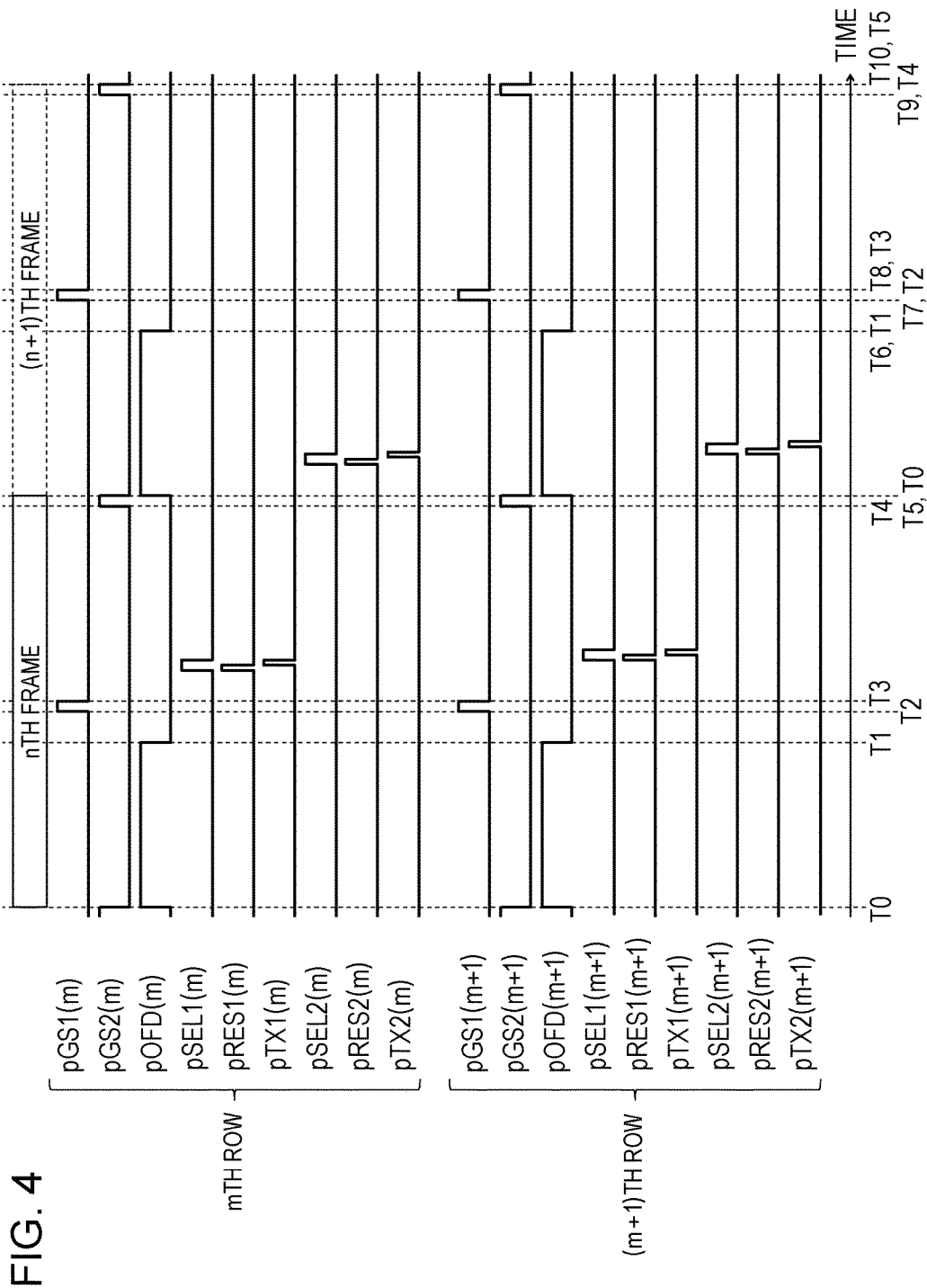
FIG. 4 illustrates operations to be performed in unit cells.

FIGS. 3 and 4 illustrate operations in the imaging apparatus for an nth frame and an (n+1)th frame. FIG. 3 illustrates times corresponding to times illustrated in FIG. 4.

Referring to FIG. 4, signals illustrated in FIG. 4 may have a High level corresponding to an active level for changing the switches receiving the signals to an ON state. On the other hand, the signals may have a Low level corresponding to a non-active level for changing the switches receiving the signals to an OFF state.

During a period from a time T0 to a time T1, the vertical scanning circuit 101 changes the signals pOFD to be supplied to the unit cells 20 of all rows to the active level. Thus, the signals accumulated in the photodiodes 1 are discharged from the photodiodes 1 with the power supply voltage 11.

At the time T1, the vertical scanning circuit 101 changes the signals pOFD to be supplied to the unit cells 20 of all rows to the non-active level. Thus, an electronic shutter operation is performed in which the photodiodes 1 in all of the unit cells 20 start accumulating signals simultaneously.

At a time T2, the vertical scanning circuit 101 changes the signals pGS1 to be supplied to the unit cells 20 of all rows to the active level. At a time T3, the vertical scanning circuit 101 changes the signals pGS1 to the non-active level. Thus, a global transfer operation is performed in which the first capacitor elements 3 in all of the unit cells 20 synchronously hold signals accumulated in the photodiodes 1 during the period from the time T1 to the time T3. The period from the time T1 to the time T3 corresponds to a first accumulation period in which the photodiodes 1 accumulate signals.

After that, the vertical scanning circuit 101 changes the signals pSEL1($m$) to the active level and the first selection switch 8 of the mth row to an ON state. The vertical scanning circuit 101 changes the signals pRES1($m$) to the active level and then resets the potential of the first input nodes 5 to the non-active level. The vertical scanning circuit 101 changes the signals pTX1($m$) to the active level and then changes them to the non-active level. Thus, signals held in the first capacitor elements 3 are transferred to the first floating diffusion capacitances FD1. The first amplifying units 7 output signals based on the signals accumulated in the photodiodes FD1 during the first accumulation period to the column signal line 10 through the first selection switches 8.

After that, the vertical scanning circuit 101 performs on the unit cells 20 of the (m+1)th row the same operations as those performed on the mth row of the unit cells 20. Thus, the vertical scanning circuit 101 sequentially reads out first optical signals corresponding to the first accumulation period in the unit cells 20 of each row to the column signal line 10.

At a time T4, the vertical scanning circuit 101 changes the signals pGS2 to be supplied to the unit cells 20 of all rows to the active level. At a time T5, the vertical scanning circuit 101 changes the signals pGS2 to the non-active level. Thus, a global transfer operation is performed in which the second capacitor elements 13 in all of the unit cells 20 synchronously hold signals accumulated in the photodiodes 1 during the period from the time T3 to the time T5. The period from the time T3 to the time T5 corresponds to a second accumulation period in which the photodiodes 1 accumulate signals. The second accumulation period is longer than the first accumulation period. The first accumulation period and the second accumulation period do not overlap at all.

After that, the vertical scanning circuit 101 changes the signals pSEL2($m$) to the active level and changes the second selection switch 18 of the mth row to an ON state. The vertical scanning circuit 101 changes the signals pRES2($m$) to the active level and then to the non-active level to reset the potential of the second input node 15. The vertical scanning circuit 101 changes the signals pTX2($m$) to the active level and then to the non-active level. Thus, the signal held in the second capacitor element 13 is transferred to the second floating diffusion capacitance FD2. Thus, the second amplifying unit 17 outputs a signal based on the signal accumulated in the photodiode 1 during the second accumulation period to the column signal line 10 through the second selection switch 18.

After that, the vertical scanning circuit 101 performs on the unit cells 20 of the (m+1)th row the same operations as those performed on the unit cells 20 of the mth row. Thus, the vertical scanning circuit 101 sequentially reads out, to the column signal line 10, second optical signals that are signals corresponding to the second accumulation period of the unit cells 20 of rows.

During a period from the time T5 to the time T6, the vertical scanning circuit 101 changes the signals pOFD to be supplied to the unit cells 20 of all rows to the active level again. Thus, the signals in the photodiodes 1 of all of the unit cells 20 are reset, like the operation in the previous period from the time T0 to the time T1.

The imaging apparatus according to this embodiment repeats the same operations on the (n+1)th frame as those performed on the nth frame.

Relationship between Capacitance Value and Conversion Output Signal

Effects of this embodiment will be described with reference to FIGS. 5A to 5D.

Figure 5A:
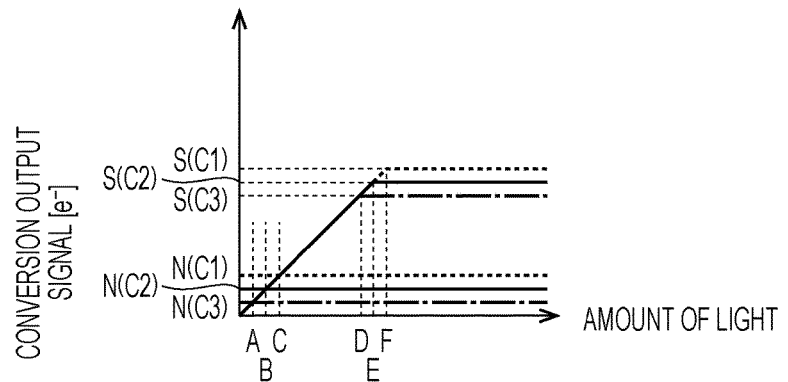
FIG. 5A illustrates a relationship among amount of light, conversion output signal, and capacitance value of an input node.

FIG. 5A is a graph having a horizontal axis indicating amount of light incident on the photodiode 1 and a vertical axis indicating conversion output signal converted from a signal output from the amplifying unit and to be input to a floating diffusion capacitance acquired.

Each of N(C1), N(C2), and N(C3) is a conversion output signal from a noise signal output from the amplifying unit when the reset of the input node of the amplifying unit is released. The noise signal has dark random noise as a principal component. Each of S(C1), S(C2), and S(C3) is a conversion output signal of an optical signal output from the amplifying unit when a signal generated by the photodiode 1 is transferred to the input node of the amplifying unit. Each of C1, C2, and C3 indicates a capacitance value of the floating diffusion capacitance. In other words, S(C1) and N(C1) indicate an optical signal and a noise signal when the capacitance value of the floating diffusion capacitance is C1. The same is true for the other S(C2), N(C2), S(C3), and N(C3). The capacitance values of the floating diffusion capacitance satisfies a relationship of:

$$C1 > C2 > C3$$

When the capacitance value of the floating diffusion capacitance is C1, the noise signal has a level of N(C1). Thus, with an amount of light equal to or lower than an amount of light C, because an optical signal is buried in the noise signal, the optical signal may not be read out. On the other hand, when the capacitance value of the floating diffusion capacitance is C3, the noise signal has a level of N(C3). Thus, with an amount of light higher than an amount of light A, an optical signal can be read out.

On the other hand, when the capacitance value of the floating diffusion capacitance is C3, an optical signal saturates at S(C3). Thus, with an amount of light equal to or higher than an amount of light D, a correct level of an optical signal may not be read out. When the capacitance value of the floating diffusion capacitance is C1 which is higher than C3, an optical signal saturates at S(C1). Thus, correct levels of optical signals can be read out up to an amount of light F.

Thus, when the capacitance value of the floating diffusion capacitance is C1, the amount of light readable as an optical signal ranges from the amount of light C to the amount of light F. On the other hand, when the capacitance value of the floating diffusion capacitance is C3, the amount of light readable as an optical signal ranges from the amount of light A to the amount of light D. Therefore, in order to read out a signal from an object having a low brightness, C3 is preferable to C1 as the capacitance value of the floating diffusion capacitance. In order to read a signal from an object having a high brightness, C1 is preferable to C3 as the capacitance value of the floating diffusion capacitance.

Figure 5B:
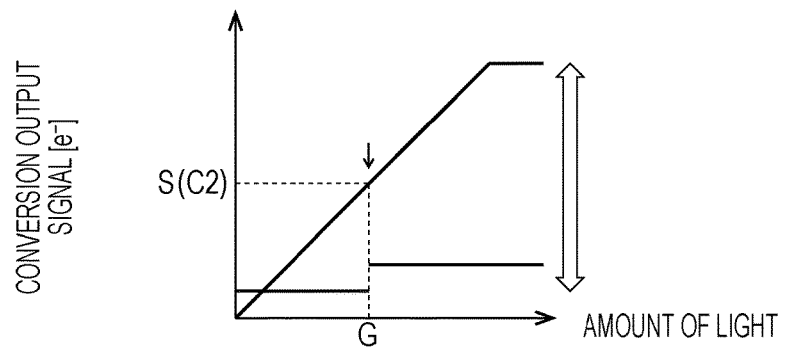
FIG. 5B illustrates a relationship among amount of light, conversion output signal, and capacitance value of an input node.
Figure 5C:
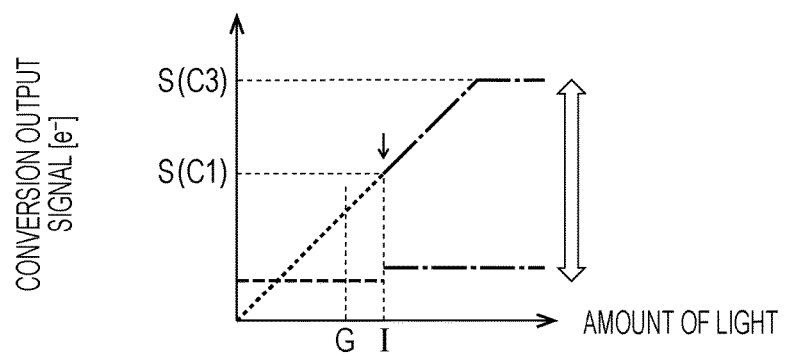
FIG. 5C illustrates a relationship among amount of light, conversion output signal, and capacitance value of an input node.
Figure 5D:
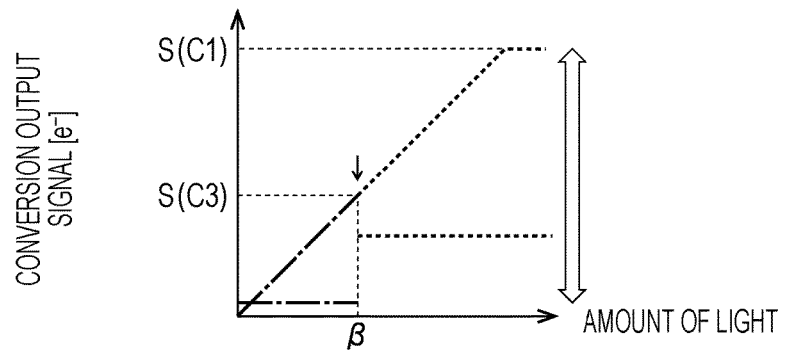
FIG. 5D illustrates a relationship among amount of light, conversion output signal, and capacitance value of an input node.

With reference to FIGS. 5B to 5D, a relationship between a capacitance value of a floating diffusion capacitance and a conversion output signal will be described with respect to a length of an accumulation period in the photodiode 1.

A dynamic range (DR) is defined by the following expression:

Dynamic Range=20*Log(S/N)

The symbol "*" refers to multiplication herein. "Log" refers to a base of 10 unless otherwise specified.

FIG. 5B illustrates a comparative example in a case during the first accumulation period (short-time accumulation period) of the photodiode 1 and a case during the second accumulation period (long-time accumulation period) where the capacitance value of the floating diffusion capacitance is C2. The second accumulation period has a length 10 times that of the first accumulation period.

A signal corresponding to the second accumulation period is applied for an object with a low brightness equal to or lower than that of the amount of light G. On the other hand, a signal corresponding to the first accumulation period is applied for an object having a high brightness equal to or higher than that of the amount of light G. The signal processing unit provided externally to the imaging apparatus performs processing for setting an equal signal range to a signal corresponding to the first accumulation period and a signal corresponding to the second accumulation period. An equal signal range may be set by multiplying a signal corresponding to the first accumulation period by 10 so as to be equal to the range of a signal corresponding to the second accumulation period because the second accumulation period has a length 10 times that of the first accumulation period. In other words, in the amount of light G, the amount of conversion output signal corresponding to the first accumulation period and the amount of conversion output signal corresponding to the second accumulation period are both S(C2).

Referring to FIG. 5B, the capacitance value of the floating diffusion capacitance to be used during the first accumulation period and the second accumulation period is C2. Thus, a signal acquired by multiplying a signal corresponding to the first accumulation period is equivalent to a signal 10 times N(C2). Therefore, an N component contained in a signal acquired by multiplying a signal corresponding to the first accumulation period is 10*N(C2) while an N component contained in a signal corresponding to the second accumulation period by 10 is N(C2). Therefore, an image generated by using a signal acquired by multiplying a signal corresponding to the first accumulation period by 10 and a signal corresponding to the second accumulation period has a part having relatively higher brightness and a part having relatively lower brightness. This is caused by a difference in size between the N components contained in the signals. Therefore, in order to suppress variations in brightness in one image, the difference may be reduced between amounts of N components contained in a signal acquired by multiplying a signal corresponding to the first accumulation period by 10 and a signal corresponding to the second accumulation period.

Accordingly, in this embodiment, a signal corresponding to the first accumulation period is generated by using the capacitance value (C3) of the first floating diffusion capacitance FD1, as described above. A signal corresponding to the second accumulation period longer than the first accumulation period is generated by using the capacitance value (C1) of the second floating diffusion capacitance FD2 that is higher than that of the first floating diffusion capacitance FD1. Thus, the signal corresponding to the first accumulation period can be generated by using the capacitance value C3 with a smaller N component. On the other hand, the signal corresponding to the second accumulation period can be generated by using the capacitance value C1 with a larger N component. This can reduce the difference between the N component of a signal acquired by multiplying the signal corresponding to the first accumulation period by 10 and the N component of the signal corresponding to the second accumulation period, compared to the example illustrated in FIG. 5B. Therefore, one image generated by using the signal acquired by multiplying the signal corresponding to the first accumulation period by 10 and the signal corresponding to the second accumulation period does not easily have variations in brightness.

A further effect of the imaging apparatus according to this embodiment will be described. Referring to FIG. 5B, the signal corresponding to the second accumulation period (with low brightness) is changed to the signal acquired by multiplying the signal corresponding to the first accumulation period by 10 (with high brightness) in response to the amount of light G. On the other hand, in the imaging apparatus according to this embodiment illustrated in FIG. 5C, a signal corresponding to the second accumulation period is generated by using the capacitance value C3 of the floating diffusion capacitance higher than the capacitance value C2. Thus, in response to an amount of light I larger than the amount of light G, a signal corresponding to the second accumulation period (with low brightness) is changed to a signal acquired by multiplying the signal corresponding to the first accumulation period by 10 (with high brightness). Because the amount of light I is larger than the amount of light G, a region with the amount of light I tends to have an increase in light shot noise more dominantly than an increase in dark random noise, compared with a region with the amount of light G. Thus, a joint between a signal corresponding to the second accumulation period and a signal acquired by multiplying the signal corresponding to the first accumulation period by 10 may be positioned in a region without a significant increase of dark random noise. Therefore, the imaging apparatus according to this embodiment may advantageously generate one image having fewer variations in brightness by using a signal acquired by multiplying the signal corresponding to the first accumulation period by 10 and a signal corresponding to the second accumulation period, compared with the case illustrated in FIG. 5B.

The imaging apparatus according to this embodiment may generate a signal corresponding to a first accumulation period by using a floating diffusion capacitance having a first capacitance value, as described above. Then, a signal corresponding to a second accumulation period longer than the first accumulation period is generated by using a floating diffusion capacitance having a second capacitance value higher than the first capacitance value. Thus, advantageously, the imaging apparatus according to this embodiment may not cause variations in brightness easily in an image by using a signal acquired by amplifying the signal corresponding to the first accumulation period and the signal corresponding to the second accumulation period.

Having described that, according to this embodiment, the first capacitor element 3 has a capacitance value equal to that of the second capacitor element 13, the capacitor elements may have different capacitance values.

In the imaging apparatus according to this embodiment, the first selection switch 8 and the second selection switch 18 are connected to the same column signal line 10. As another example, a plurality of column signal lines 10 may be provided for unit cells 20 of one column, and one of the plurality of column signal lines 10 may be connected to the first selection switch 8, and the other one of the plurality of column signal lines 10 may be connected to the second selection switch 18.

According to this embodiment, an electronic shutter operation and a global transfer operation may be synchronized to an extent sufficient for practical use. Driving all of the unit cells 20 in complete synchronization imposes a large load on a driver responsible for the driving. In order to reduce the load, an electronic shutter operation and a global transfer operation may be performed on a plurality of unit cells 20 at times with a small time difference between the unit cells 20. Even in this case, the electronic shutter operation and the global transfer operation may substantially be categorized into "synchronized operations".

Second Embodiment

An imaging apparatus according to a second embodiment will be described with focus on differences from the first embodiment mainly.

The imaging apparatus according to the first embodiment generates a signal corresponding to a first accumulation period by using a floating diffusion capacitance having a first capacitance value. A signal corresponding to a second accumulation period longer than the first accumulation period is generated by using a floating diffusion capacitance having a second capacitance value higher than the first capacitance value. On the other hand, the imaging apparatus according to this embodiment generates a signal corresponding to a first accumulation period by using a floating diffusion capacitance having a second capacitance value higher than a first capacitance value. A signal corresponding to a second accumulation period longer than the first accumulation period is generated by using a floating diffusion capacitance having the first capacitance value.

The imaging apparatus according to this embodiment may have the same configuration as that of the first embodiment. This embodiment is different from the first embodiment in that a signal generated during a first accumulation period is transferred to a floating diffusion capacitance FD2 having a second capacitance value. A signal generated during a second accumulation period longer than the first accumulation period is transferred to a floating diffusion capacitance FD1 having the first capacitance value.

Effects of this embodiment will be described.

FIG. 5D illustrates an effect of this embodiment.

In a comparative example in FIG. 5B, a floating diffusion capacitance to be used during a first accumulation period and a second accumulation period has a capacitance value of C2. Thus, a lower limit of a possible range of an S component of a signal corresponding to the second accumulation period is compressed by N(C2). An upper limit of a possible range of a signal acquired by multiplying the signal corresponding to the first accumulation period by 10 has a level at which the floating diffusion capacitance having the capacitance value C2 saturates.

On the other hand, the imaging apparatus according to this embodiment generates a signal corresponding to the second accumulation period by using the floating diffusion capacitance having a first capacitance value (C3). Thus, the signal corresponding to the second accumulation period has an N component of N(C3) smaller than N(C2). Therefore, the lower limit of the possible range of the S component of the signal corresponding to the second accumulation period can be more extended, compared with a case where a signal corresponding to the second accumulation period is generate by using the floating diffusion capacitance having the capacitance value C2. The lower limit of the possible range of the S component of a signal corresponding to the second accumulation period can be more extended, compared to a case where a signal corresponding to the second accumulation period is generated by using the floating diffusion capacitance having the capacitance value C2. The possible range of a signal acquired by multiplying the signal corresponding to the first accumulation period by 10 is S(C1) larger than S(C2). Thus, the upper limit of the possible range of a signal corresponding to the first accumulation period can be more extended, compared with a case where a signal corresponding to the first accumulation period is generated by using the floating diffusion capacitance having the capacitance value C2.

The imaging apparatus according to this embodiment generates a signal corresponding to the first accumulation period by using a floating diffusion capacitance having a first capacitance value higher than a second capacitance value. A signal corresponding to a second accumulation period longer than a first accumulation period is generated by using the floating diffusion capacitance having the first capacitance value. Thus, the imaging apparatus according to this embodiment can extend the upper limit of the possible range of the signal corresponding to the first accumulation period and the lower limit of the possible range of the signal corresponding to the second accumulation period, compared with a case where an equal capacitance value is used to generate signals corresponding to the first accumulation period and the second accumulation period. In other words, the imaging apparatus according to this embodiment can extend dynamic ranges of a signal corresponding to the first accumulation period and a signal corresponding to the second accumulation period, compared with conventional imaging apparatuses.

Third Embodiment

An imaging apparatus according to a third embodiment will be described with reference to differences from the first embodiment.

In each of the unit cells 20 in the imaging apparatus according to the first embodiment, the floating diffusion capacitance FD1 and the floating diffusion capacitance FD2 have different capacitance values from each other. In the imaging apparatus according to this embodiment, the floating diffusion capacitance FD1 and the floating diffusion capacitance FD2 have an equal capacitance value. In each of the unit cells 20 in the imaging apparatus according to this embodiment, a capacitance addition switch connected to one floating diffusion capacitance. The capacitance addition switch is usable for adding a capacitance.

Figure 6:
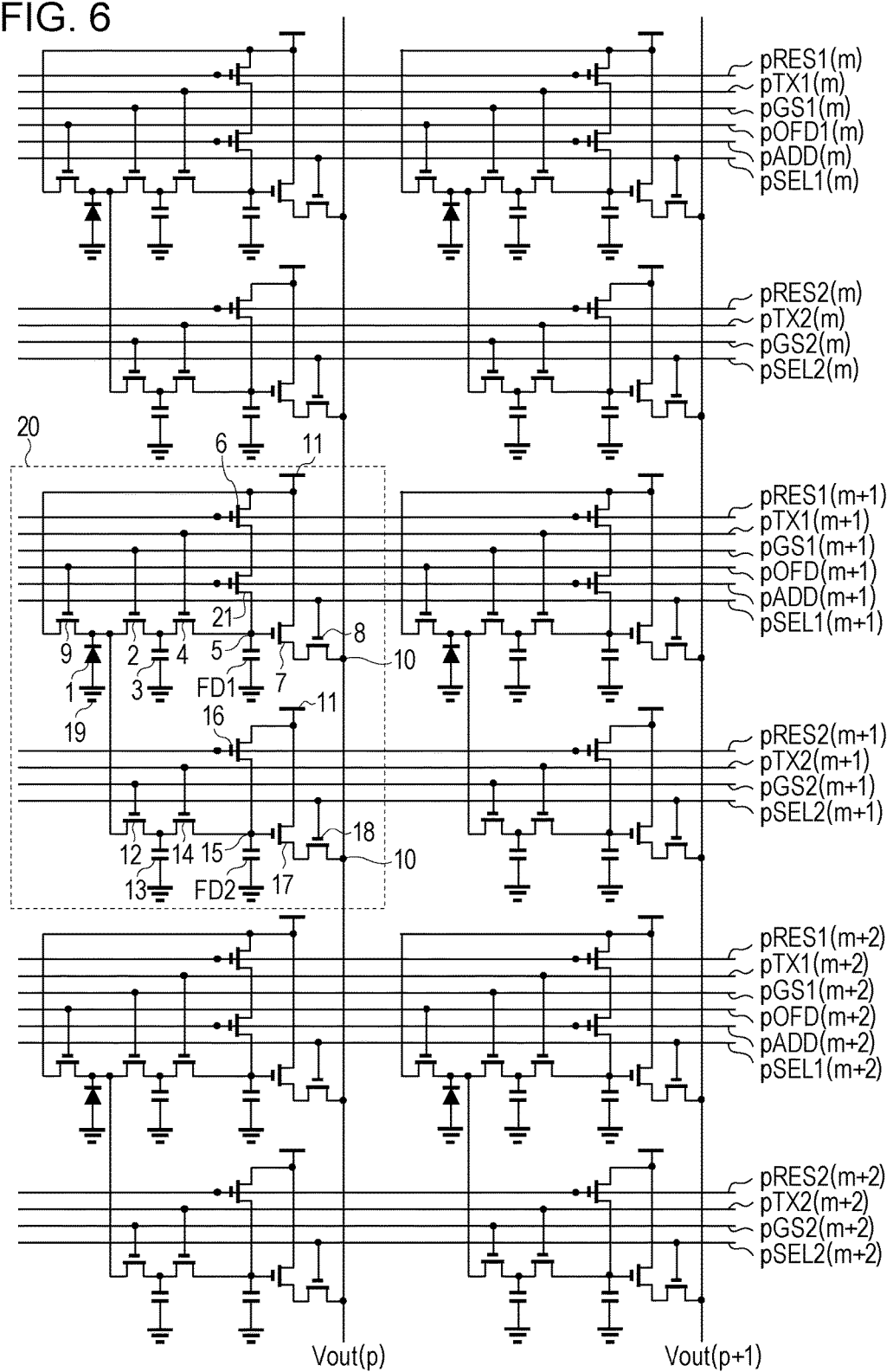
FIG. 6 illustrates a configuration of unit cells.

FIG. 6 illustrates a configuration of the imaging apparatus according to this embodiment.

In each of the unit cells 20 in the imaging apparatus according to this embodiment, a transistor 21 and a control line pADD(m) therefor are provided between the input node 5 and the first reset switch 6, unlike the first embodiment. When the control signal pADD(m) is changed to have a High level, the transistor 21 is turned on. Thus, a capacitance connected to the input node 5 is equal to a capacitance acquired by synthesizing the floating diffusion capacitance FD1 and a capacitance in the transistor 21. In other words, the transistor 21 corresponds to a capacitance changing unit configured to change the capacitance value of the floating diffusion capacitance FD1. According to this embodiment, the transistor 21 being a capacitance addition transistor is used as a typical example of the capacitance changing unit.

In the imaging apparatus according to the first embodiment, the floating diffusion capacitance FD2 has a capacitance value higher than the capacitance value of the floating diffusion capacitance FD1. Thus, the capacitance value of a capacitance connected to the input node 15 is higher than a capacitance connected to the input node 5.

On the other hand, according to this embodiment, the transistor 21 having an ON state is connected to the floating diffusion capacitance FD1 so that the capacitance connected to the input node 5 can have a capacitance value higher than the capacitance value of the capacitance connected to the input node 15. Thus, a signal, which is transferred from the photodiode 1 to the floating diffusion capacitance FD2 through the second capacitor element 13 according to the first embodiment, can be transferred to a synthesized capacitance of the floating diffusion capacitance FD1 and the transistor 21 through the first capacitor element 3 according to this embodiment. A signal, which is transferred from the photodiode 1 to the floating diffusion capacitance FD1 through the first capacitor element 3 according to the second embodiment, can be transferred to the floating diffusion capacitance FD2 through the second capacitor element 13 according to this embodiment. Thus, the same effect as that of the first embodiment can be acquired.

In the imaging apparatus according to this embodiment, signals can be read out from the unit cells 20 by keeping the transistor 21 at an OFF state in accordance with a given imaging scene.

According to this embodiment, a capacitance changing unit is provided for the input node 5. However, the imaging apparatus according to this embodiment is not limited to the example, but no capacitance changing unit may be provided for the input node 15. In this case, one of a capacitance addition transistor connected to the input node 5 and a capacitance addition transistor connected to the input node 15 may be changed to have an ON state.

As such a capacitance changing unit, a capacitance addition transistor is provided on an electrical path between the first reset switch 6 and the input node 5 according to this embodiment. As another example, a capacitor element including a plurality of nodes and a switch may be provided so that a capacitance changing unit can be provided which allows connection of one of the plurality of nodes to the input node 5 through the switch and application of a reference potential (such as a ground potential) to the other node. In this case, when the switch is turned on, the capacitance value of the capacitor element is added to the capacitance value of the floating diffusion capacitance FD1.

According to this embodiment, the input node 5 has two types of capacitance value produced when the transistor 21 has an ON state and an OFF state. However, the input node 5 may have various kinds of capacitance value.

Fourth Embodiment

An imaging apparatus according to an embodiment will be described with focus on differences from the third embodiment mainly.

Figure 7:
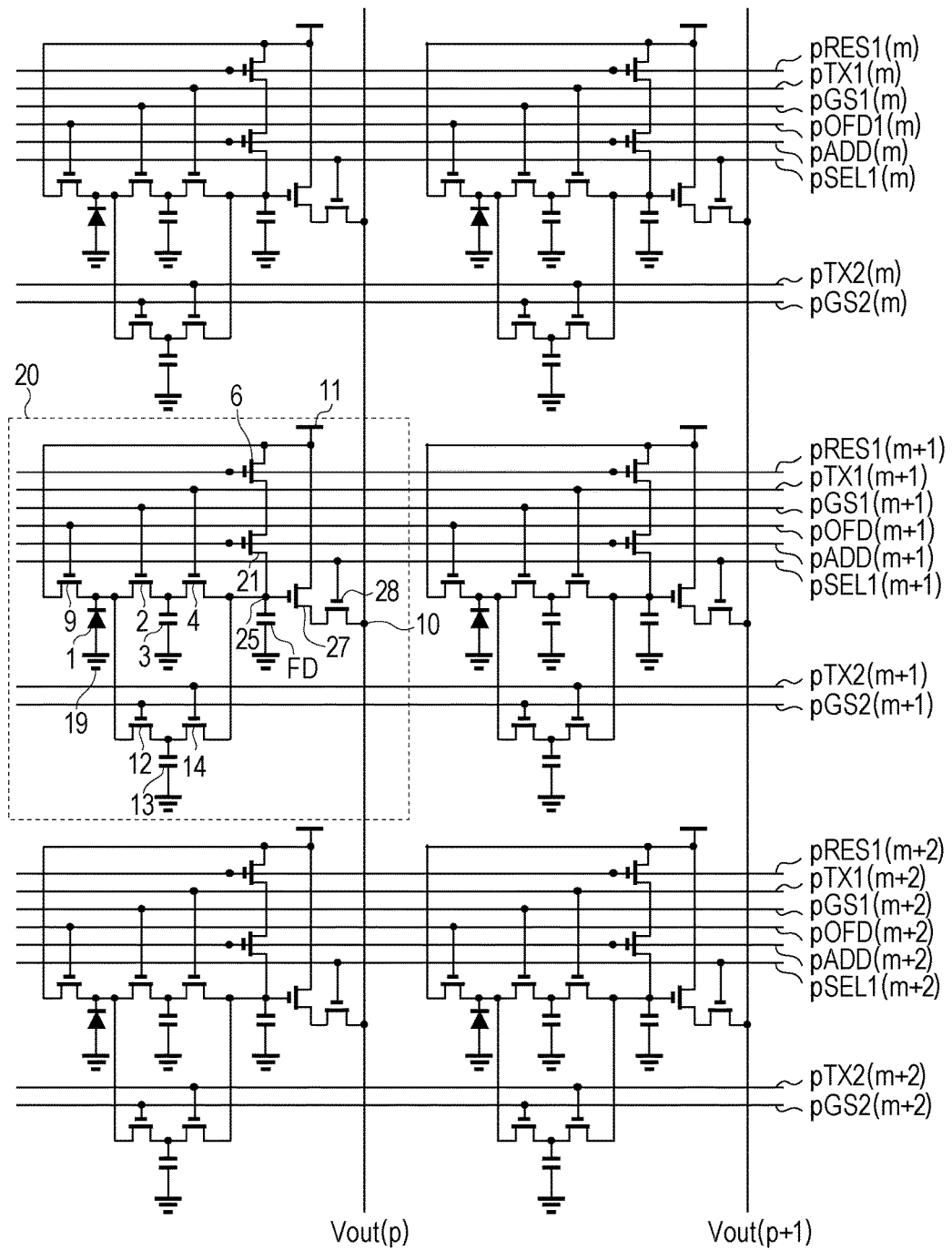
FIG. 7 illustrates a configuration of unit cells.

FIG. 7 illustrates a configuration of the unit cells 20 in the imaging apparatus according to this embodiment. Each of the unit cells 20 according to the first embodiment has an amplifying unit (first amplifying unit 7) corresponding to the first capacitor element 3 and an amplifying unit (second amplifying unit 17) corresponding to the second capacitor element 13. In each of the unit cells 20 in the imaging apparatus according to this embodiment, one amplifying unit 27 is provided for the first capacitor element 3 and the second capacitor element 13, which is different from the first embodiment. The amplifying unit 27 is connected to the column signal line 10 through a selection switch 28.

The transistor 21 as a capacitance addition transistor is connected to the input node 25, like the third embodiment.

According to this embodiment, one unit cell 20 corresponds to one group of an photoelectric converting unit, a first transfer unit, a second transfer unit, a third transfer unit, a fourth transfer unit, a first signal holding unit, a second signal holding unit, and an amplifying unit.

In each of the unit cells 20 according to this embodiment, a signal held in the first capacitor element 3 is transferred to the transistor 21 having an ON state and a synthesized capacitance of floating diffusion capacitances FD. On the other hand, a signal held in the second capacitor element 13 changes the transistor 21 to have an OFF state and is transferred to the floating diffusion capacitance FD. It is assumed here that a signal held in the first capacitor element 3 corresponds to a signal corresponding to a second accumulation period longer than a first accumulation period and that a signal held in the second capacitor element 13 corresponds to a signal corresponding to the first accumulation period. This operation can provide the same effect as that of the first embodiment.

On the other hand, it is assumed that a signal held in the first capacitor element 3 corresponds to a signal corresponding to a first accumulation period and that a signal held in the second capacitor element 13 corresponds to a signal corresponding to a second accumulation period longer than the first accumulation period. By performing this operation, the imaging apparatus according to this embodiment can provide the same effect as that of the second embodiment.

Each of the unit cells 20 in the imaging apparatus according to this embodiment may have one of a plurality of floating diffusion capacitances, one of a plurality of amplifying units, and one of a plurality of selection switches which are provided in the first embodiment and the second embodiment. Thus, each of the unit cells 20 in the imaging apparatus according to this embodiment may have a reduced circuit area compared with that in each of the unit cells according to the first embodiment and the second embodiment. The reduction in circuit area may be used for increasing the areas of the photodiode 1, the first capacitor element 3, and the second capacitor element 13. The increased area of the photodiode 1 can increase the sensitivity and signal saturating amount of the photodiode 1. Increased areas for the first capacitor element 3 and the second capacitor element 13 can increase their signal saturating amounts.

Fifth Embodiment

An imaging apparatus according to an embodiment will be described with focus on differences from the fourth embodiment mainly.

Figure 8:
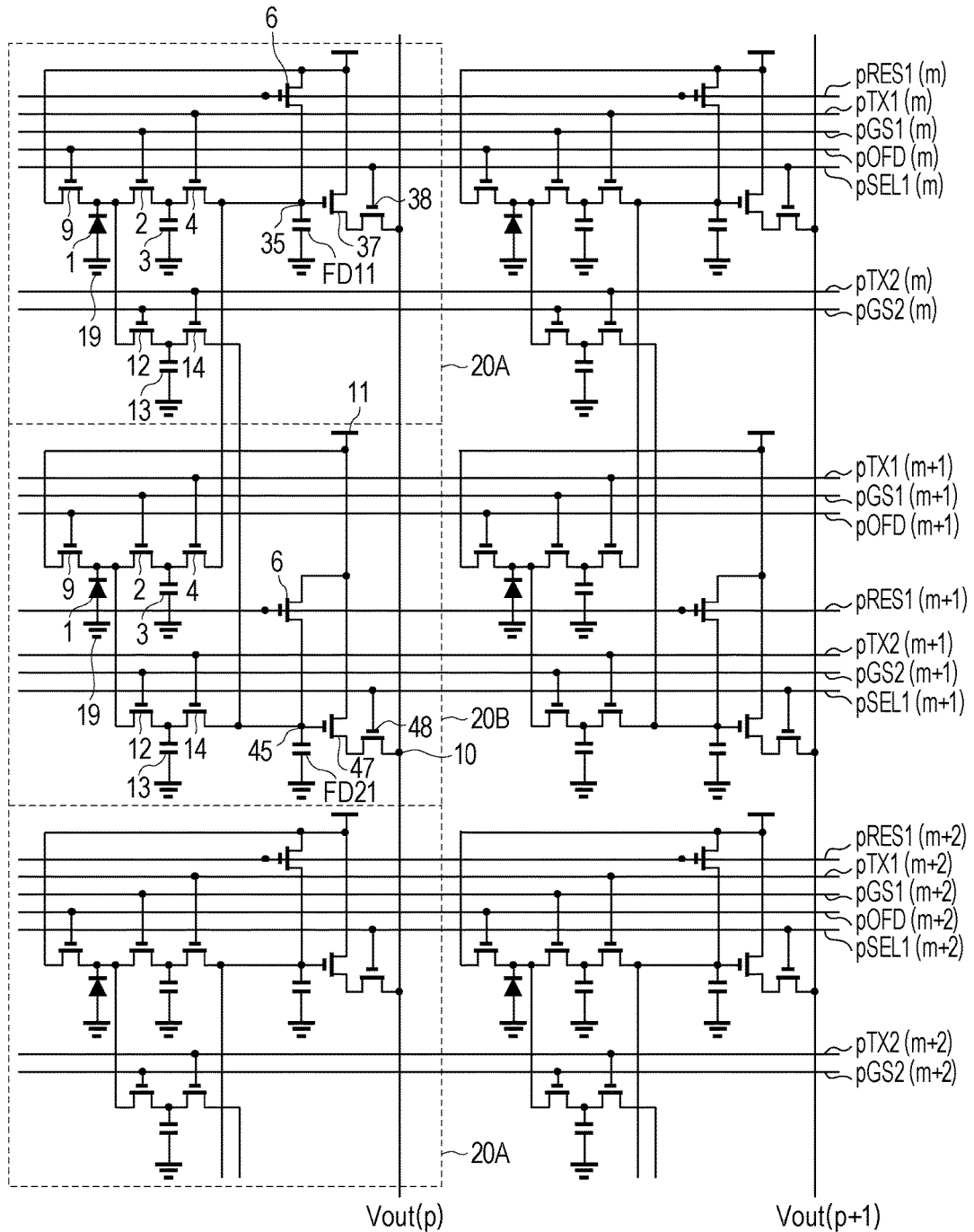
FIG. 8 illustrates a configuration of unit cells.

FIG. 8 illustrates a configuration of the unit cells in the imaging apparatus according to this embodiment. The imaging apparatus according to this embodiment has unit cells 20A and 20B. Each of the unit cells 20A has a floating diffusion capacitance FD11, an amplifying unit 37, and a selection switch 38. Each of the unit cells 20B has a floating diffusion capacitance FD21, an amplifying unit 47, and a selection switch 48. The floating diffusion capacitance FD11 has a capacitance value higher than a capacitance value of the floating diffusion capacitance FD21. A second transfer switch 4 of each of the unit cells 20A and 20B is connected to an input node 35. A fourth transfer switch 14 of each of the unit cells 20A and 20B is connected to an input node 45.

According to this embodiment, one unit cell 20 corresponds to one group of a photoelectric converting unit, a first transfer unit, a second transfer unit, a third transfer unit, a fourth transfer unit, a first signal holding unit, a second signal holding unit, and an amplifying unit.

It is assumed that, in the imaging apparatus according to this embodiment, a signal held in the first capacitor element 3 of each of the unit cells 20A and 20B corresponds to a signal corresponding to a second accumulation period longer than a first accumulation period. It is assumed that a signal held in the second capacitor element 13 in each of the unit cells 20A and 20B corresponds to a signal corresponding to the first accumulation period. A signal held in the first capacitor element 3 in each of the unit cells 20A is first transferred to the floating diffusion capacitance FD11. The amplifying unit 37 then outputs a signal corresponding to the signal held in the first capacitor element 3 in each of the unit cells 20A to the column signal line 10. After that, when the first reset switch 6 in each of the unit cells 20A is turned on, a signal in the floating diffusion capacitance FD11 is reset. A signal held in the first capacitor element 3 in each of the unit cells 20B is transferred to the floating diffusion capacitance FD11. Then, the amplifying unit 37 outputs a signal corresponding to the signal held in the first capacitor element 3 in the unit cell 20B to the column signal line 10.

The signal held in the second capacitor element 13 in the unit cell 20A is transferred to the floating diffusion capacitance FD21. Then, the amplifying unit 47 outputs a signal corresponding to the signal held in the second capacitor element 13 in the unit cell 20A to the column signal line 10. After that, the first reset switch 6 in the unit cell 20B is turned on to reset the signal in the floating diffusion capacitance FD21. The signal held in the second capacitor element 13 in the unit cell 20B is transferred to the floating diffusion capacitance FD21. The amplifying unit 47 then outputs a signal corresponding to the signal held in the second capacitor element 13 in the unit cell 20B to the column signal line 10.

Thus, the imaging apparatus according to this embodiment can provide the same effect as that of the first embodiment. Also in the imaging apparatus according to this embodiment, a signal held in the first capacitor element 3 may correspond to a signal corresponding to the first accumulation period, and a signal held in the second capacitor element 13 may correspond to a signal corresponding to the second accumulation period longer than the first accumulation period. By performing this operation, the imaging apparatus according to this embodiment can provide the same effect as that of the second embodiment.

In the imaging apparatus according to the third embodiment, each of the unit cells 20 has a capacitance addition transistor. The unit cells 20A and 20B without the capacitance addition transistor in the imaging apparatus according to this embodiment can provide the same effect as those of the first embodiment and second embodiment. The unit cells 20A and 20B in the imaging apparatus according to this embodiment can advantageously have a reduced circuit area, compared with the circuit area of the unit cells 20 in the imaging apparatus according to the third embodiment. The area acquired by the reduction in circuit area may be used for increasing the areas of the photodiode 1, the first capacitor element 3, and the second capacitor element 13. The increased area of the photodiode 1 can increase the sensitivity and the signal saturating amount of the photodiode 1. Increased areas of the first capacitor element 3 and the second capacitor element 13 can increase their signal saturating amounts.

Sixth Embodiment

An imaging apparatus according to this embodiment will be described with focus on differences from the fifth embodiment mainly.

Figure 9:
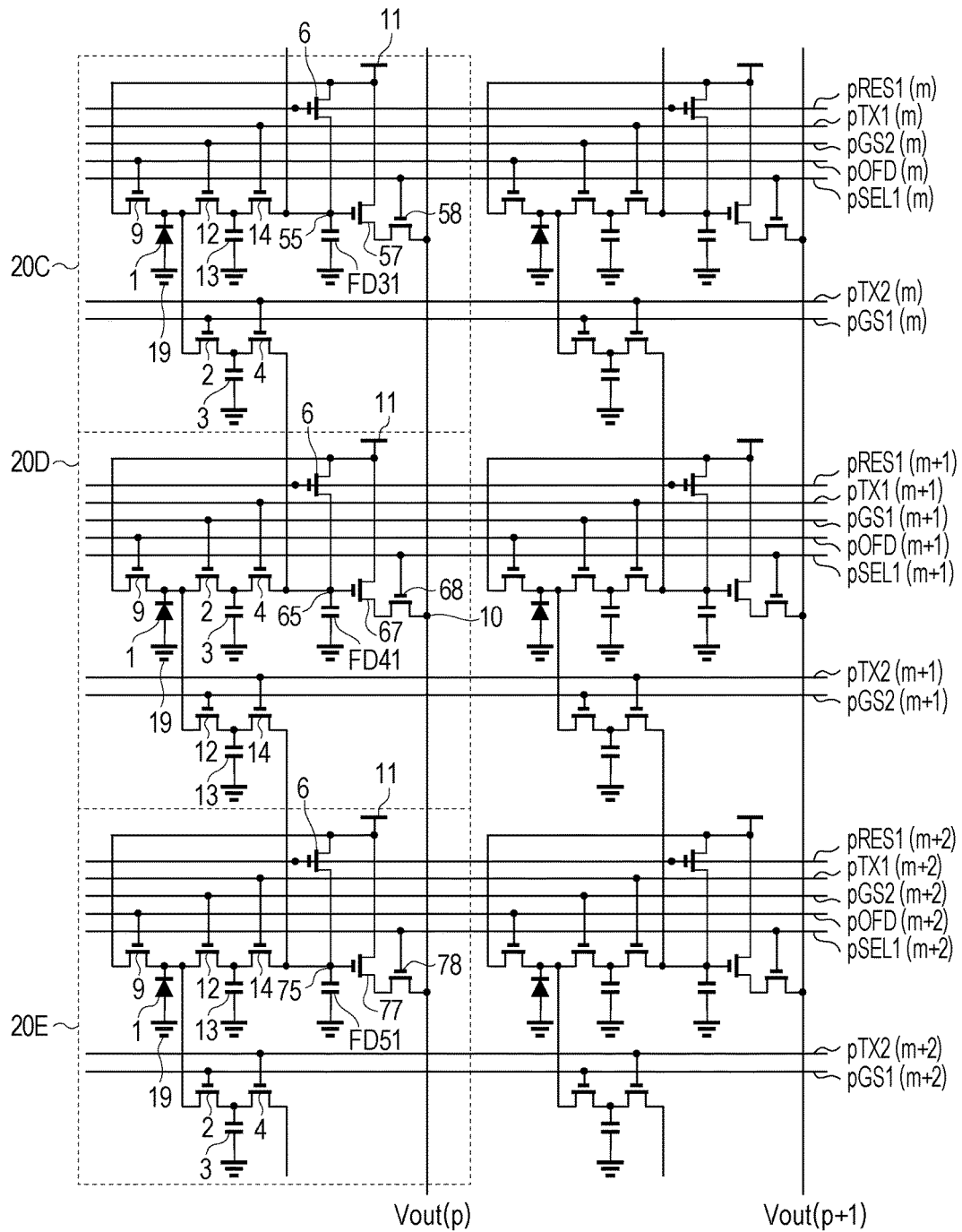
FIG. 9 illustrates a configuration of unit cells.

FIG. 9 illustrates configurations of unit cells 20C, 20D, and 20E in the imaging apparatus according to this embodiment.

In the unit cells 20A and 20B in the imaging apparatus according to the fifth embodiment, the second transfer switch 4 in each of the unit cells 20B is connected to the input node 35 in the corresponding unit cell 20A through a line (first line). The fourth transfer switch 14 in each of the unit cells 20A is connected to the input node 45 in the corresponding unit cell 20B through a line (second line). With this connection relationship, the first line and the second line run in parallel in a part of the unit cell 20A and the unit cell 20B. In this layout, a parasitic capacitance caused by the parallel first line and the second line may reduce the signal accuracy of a signal transferred to the input nodes. When the first line and the second line are spaced by an increased distance to reduce the capacitance value of the parasitic capacitance, the circuit area for the unit cells may increase.

The imaging apparatus according to this embodiment has the unit cells 20C, 20D, and 20E. Each of the unit cells 20C has a floating diffusion capacitance FD31, an input node 55, an amplifying unit 57, and a selection switch 58.

Each of the unit cells 20D has a floating diffusion capacitance FD41, an input node 65, an amplifying unit 67, and a selection switch 68.

Each of the unit cells 20E has a floating diffusion capacitance FD51, an input node 75, an amplifying unit 77, and a selection switch 78.

The floating diffusion capacitances FD31 and FD51 have an equal capacitance value. The floating diffusion capacitance FD41 has a capacitance value higher than those of the floating diffusion capacitances FD31 and FD51.

The second transfer switch 4 in each of the unit cells 20C is connected to the input node 65 in the corresponding unit cell 20D. The fourth transfer switch 14 in each of the unit cell 20D is connected to the input node 75 in the corresponding unit cell 20E.

In other words, the unit cell 20D is provided as a first unit cell being one unit cell in a part of a plurality of unit cells 20. The unit cell 20C is provided as a second unit cell being one unit cell in another part of the plurality of unit cells 20. The unit cell 20E is provided as a third unit cell being one unit cell in another part of the plurality of unit cells 20. The second transfer switch 4 being the second transfer unit in the first unit cell and the second transfer switch 4 being the second transfer unit in the second unit cell are connected to the input node 65 being an input node of the first unit cell. The fourth transfer switch 14 being the fourth transfer unit in the first unit cell and the fourth transfer switch 14 being the fourth transfer unit in the third unit cell are connected to the input node 75 being an input node of the third unit cell. The second unit cell, the first unit cell, and the third unit cell are arranged in order without any other unit cell therebetween.

In this configuration, lines connecting a transfer switch in one unit cell of a plurality of unit cells and an input node in the other unit cell thereof can be disposed so as not to run in parallel. This can reduce the parasitic capacitance caused by the parallel first line and second line in the imaging apparatus according to the fifth embodiment. Thus, in the imaging apparatus according to this embodiment, the signal accuracy of signals to be transferred to the input nodes may not easily be reduced.

Seventh Embodiment

An imaging apparatus according to a seventh embodiment will be described with focus on differences from the fourth embodiment mainly.

Figure 10:
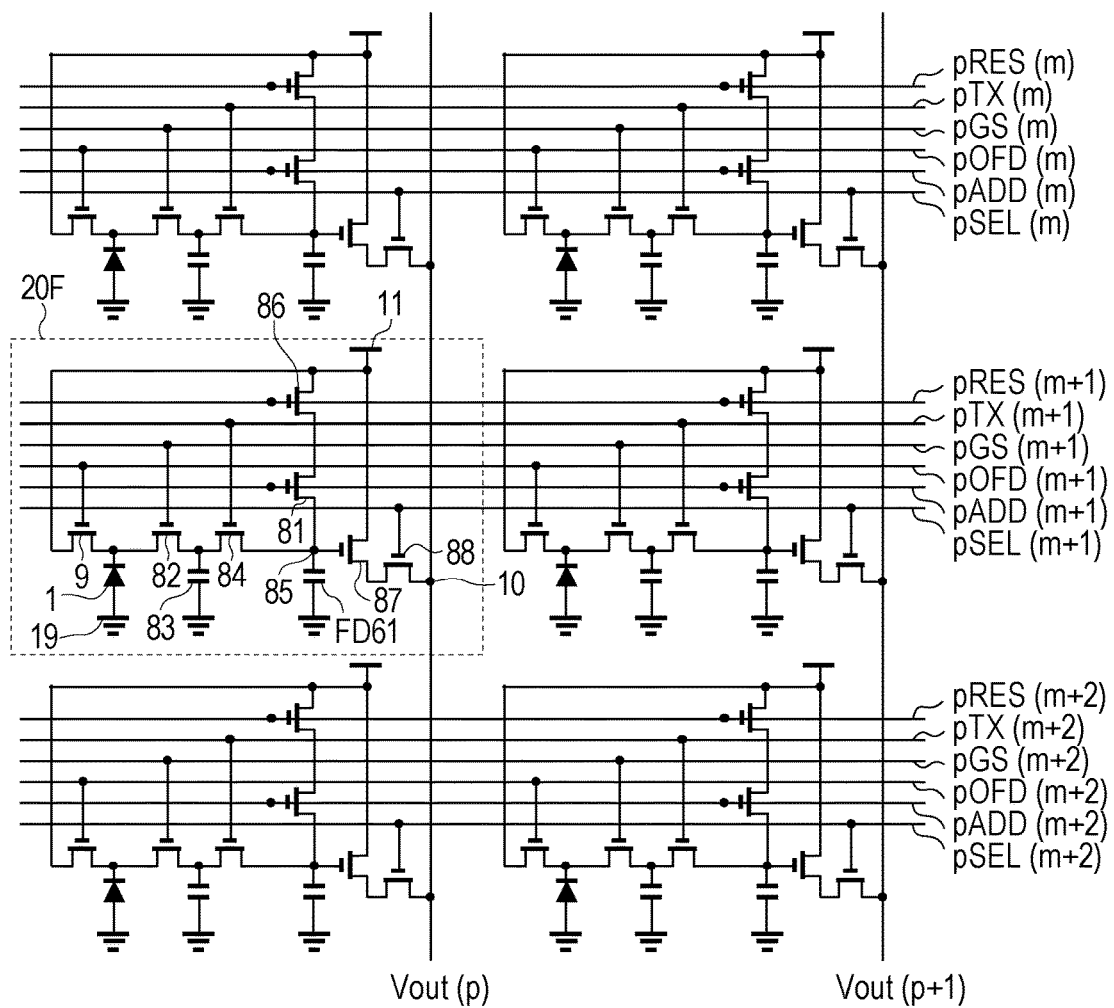
FIG. 10 illustrates a configuration of unit cells.

FIG. 10 illustrates a configuration of unit cells 20F in the imaging apparatus according to this embodiment. Each of the unit cells 20 in the imaging apparatus according to the fourth embodiment has the second capacitor element 13, the third transfer switch 12, and the fourth transfer switch 14. Each of the unit cells 20F in the imaging apparatus according to this embodiment does not have the second capacitor element 13, the third transfer switch 12, and the fourth transfer switch 14.

Each of the unit cells 20F has a transistor 81, a first transfer switch 82, a capacitor element 83, a second transfer switch 84, an input node 85, a selection switch 88, and a floating diffusion capacitance FD61. The transistor 81 is a capacitance addition transistor.

According to this embodiment, a signal corresponding to a first accumulation period is transferred to an input node having a first capacitance value higher than a second capacitance value, and a signal corresponding to a second accumulation period longer than the first accumulation period is transferred to an input node having the first capacitance value, like the second embodiment.

Figure 11:
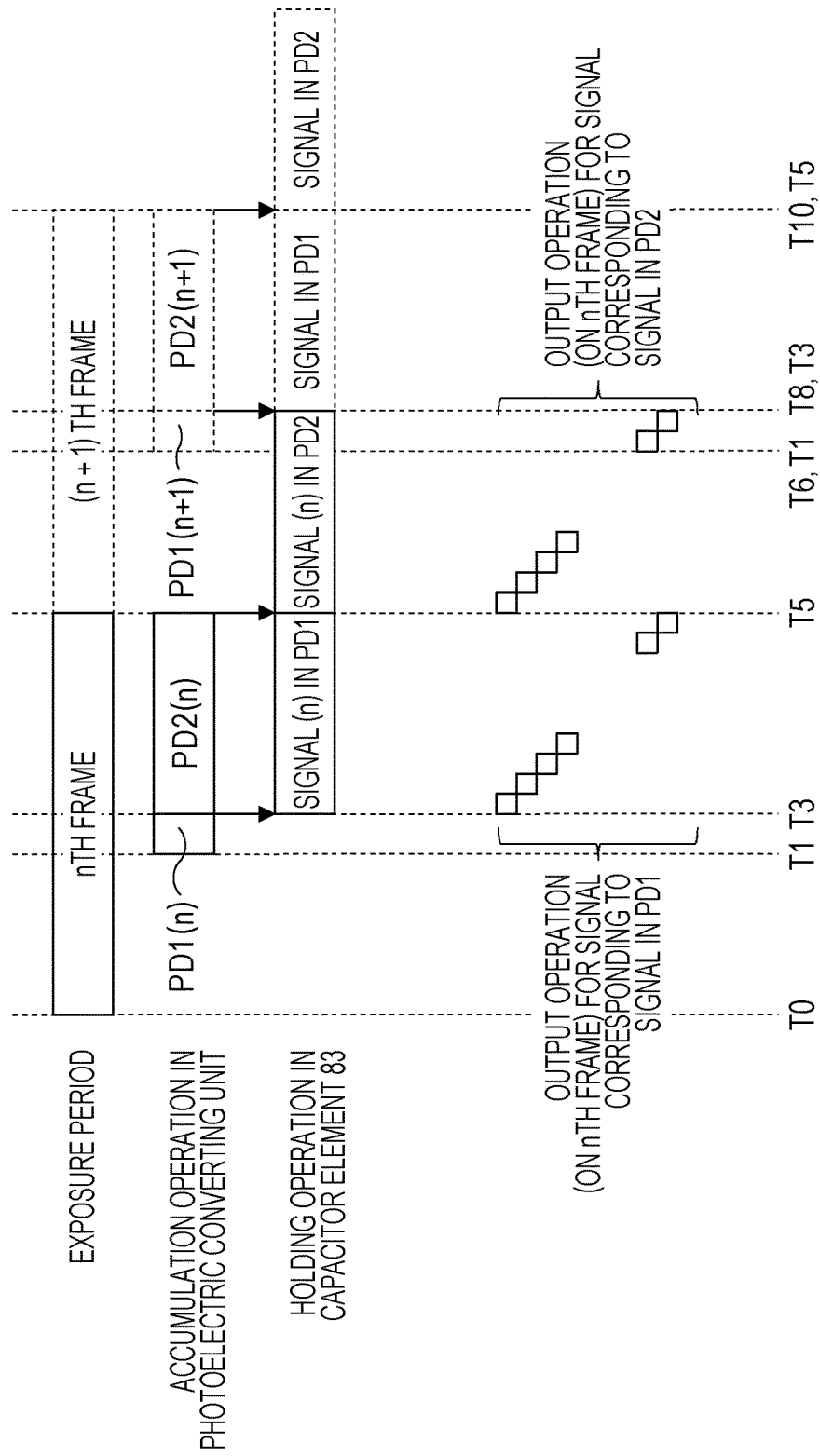
FIG. 11 illustrates operations to be performed in unit cells.

FIG. 11 illustrates operations to be performed in the imaging apparatus illustrated in FIG. 10. The illustrated operations include operations to be performed on an nth frame and a (n+1)th frame subsequent to the nth frame.

In a period from a time T1 to a time T3, the photodiode 1 accumulates a signal. Hereinafter, the signal is called a signal PD1($n$). In a period from the time T3 to a time T5, the photodiode 1 accumulates a signal. Hereinafter, this signal will be called a signal PD2($n$).

At the time T3, the signal PD1($n$) is transferred to the capacitor element 83. After that, the signal PD1($n$) held in the capacitor element 83 turns on the transistor 81 and is transferred to a synthesized capacitance of the transistor 81 and the floating diffusion capacitance FD61. The vertical scanning circuit 101 sequentially turns on the selection switches 88 of rows so that the amplifying units 87 of the rows are caused to output signals corresponding to the signal PD1($n$).

At the time T5, the signal PD2(*n*) is transferred to the capacitor element 83. After that, the signal PD2(*n*) held in the capacitor element 83 turns off the transistor 81 and is transferred to the floating diffusion capacitance FD61. The vertical scanning circuit 101 sequentially turns on the selection switches 88 of the rows so that the amplifying units 87 of the rows are caused to output signals corresponding to the signal PD2(*n*).

At and after a time T6, the operations at and after the time T1 are repeated.

Figure 12:
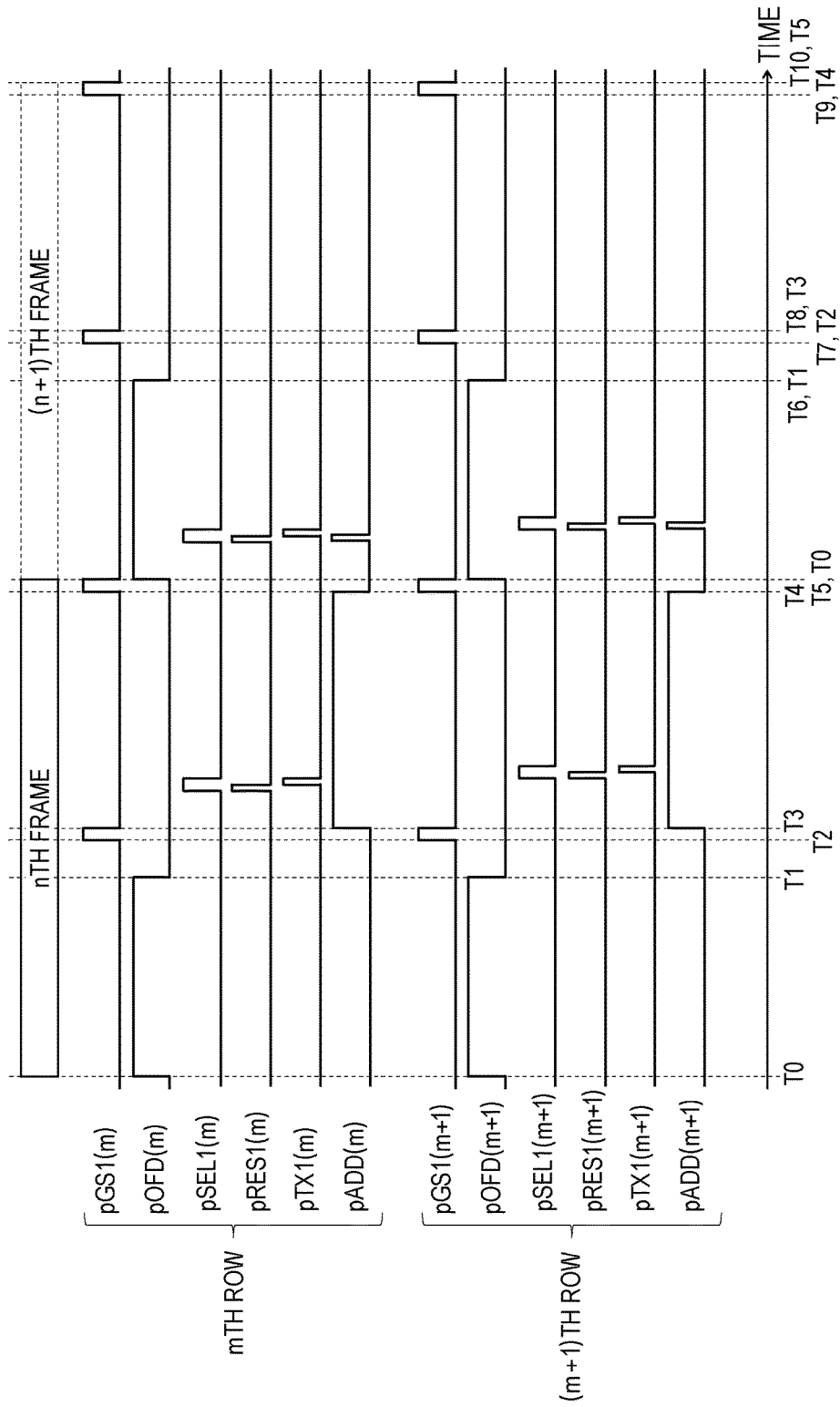
FIG. 12 illustrates operations to be performed in unit cells.

With reference to FIG. 12, details of the operations illustrated in FIG. 11 will be described. Times illustrated in FIG. 12 correspond to the times illustrated in FIG. 11.

In a period from the time T0 to the time T1, the vertical scanning circuit 101 changes the signal pOFD to a High level in the unit cells 20F of all rows.

At the time T1, the vertical scanning circuit 101 changes the signal pOFD to a Low level in the unit cells 20F of all rows. Thus, the photodiodes 1 of all of the rows start accumulating signals.

At a time T2, the vertical scanning circuit 101 changes the signal pGS1 to a High level in the unit cells 20F of all of the rows. After that, at the time T3, the vertical scanning circuit 101 changes signal pGS1 to a Low level in the unit cells 20F of all of the rows. Thus, the capacitor elements 83 in all of the unit cells 20F hold the signal PD1(*n*). The period from the time T1 to the time T3 corresponds to a first accumulation period for accumulating a signal in the photodiode 1.

At the time T3, the vertical scanning circuit 101 changes a signal pADD to a High level in the unit cells 20F of all rows. Thus, the transistors 81 in all of the unit cells 20F are connected to the input nodes 85.

After the time T3, the vertical scanning circuit 101 changes the signal pSEL1(*m*) to be output to the unit cells 20F of an mth row to a High level. During the period when the signal pSEL(m) is being changed to a High level, the vertical scanning circuit 101 changes the signal pRES(m) to a High level and then to a Low level. Thus, the signals in the floating diffusion capacitance FD85 are reset.

After the signal pRES(m) is changed to a Low level, the vertical scanning circuit 101 changes the signal pTX1(*m*) to a High level and then to a Low level. Thus, the signal PD1(*n*) is transferred to a synthesized capacitance of the transistor 81 and the floating diffusion capacitance FD85. Thus, the amplifying units 87 output output signals corresponding to the signal PD1(*n*) to the column signal line 10.

After that, the vertical scanning circuit 101 changes the signal pSEL(m) to a Low level. Subsequently, the signal pSEL(m+1) is changed to a High level. After that, the vertical scanning circuit 101 performs an operation for sequentially reading out signals corresponding to the signal PD1(*n*) from the unit cells 20F of each row.

At a time T4, the vertical scanning circuit 101 changes the signal pADD to a Low level in the unit cells 20F of all rows.

At the time T4, the vertical scanning circuit 101 also changes the signal pGS1 to a High level in the unit cells 20F of all of the rows. After that, at a time T5, the vertical scanning circuit 101 changes the signal pGS1 to a Low level in the unit cells 20F of all of the rows. Thus, the capacitor elements 83 in all of the unit cells 20F hold the signal PD2(*n*). The period from the time T3 to the time T5 corresponds to a second accumulation period for accumulating signals in the photodiodes 1. The second accumulation period is longer than the first accumulation period.

After the time T5, the vertical scanning circuit 101 changes the signal pSEL1(*m*) to be output to the unit cells 20F of the mth row to a High level. During the period in which the signal pSEL(m) is being changed to a High level, the vertical scanning circuit 101 changes the signal pRES (m) and the signal pADD(m) to a High level and then to a Low level. Thus, the signals in the floating diffusion capacitances FD85 are reset.

After the signal pRES(m) and the signal pADD(m) are changed to a Low level, the vertical scanning circuit 101 changes the signal pTX1(*m*) to a High level and then to a Low level. Thus, the signal PD2(*n*) is transferred to the floating diffusion capacitance FD85. The amplifying units 87 output a signal corresponding to the signal PD2(*n*) to the column signal line 10.

After that, the vertical scanning circuit 101 changes the signal pSEL(m) to a Low level. Subsequently, the signal pSEL(m+1) is changed to a High level. After that, the vertical scanning circuit 101 performs an operation for sequentially reading out signals corresponding to the signal PD2(*n*) from the unit cells 20F of the rows.

Thus, the imaging apparatus according to this embodiment can provide the same effect as that of the imaging apparatus of the second embodiment. Each of the unit cells 20F in the imaging apparatus according to this embodiment does not have the third transfer switch 12, the second capacitor element 13, and the fourth transfer switch 14, compared with the unit cells 20 in the imaging apparatus according to the fourth embodiment. Thus, the unit cells 20F of this embodiment can have a reduced circuit area, compared with the circuit area of the unit cells 20 in the fourth embodiment. The area acquired by the reduction in circuit area may be used for increasing the areas of the photodiode 1 and the capacitor element 83. The increased area of the photodiode 1 can increase the sensitivity and the signal saturating amount of the photodiode 1. An increased area of the capacitor element 83 can increase its signal saturating amount.

According to this embodiment, a signal corresponding to a first accumulation period is transferred to an input node having a second capacitance value higher than a first capacitance value, and a signal corresponding to a second accumulation period longer than the first accumulation period is transferred to an input node having the first capacitance value. Alternatively, in this embodiment, a signal corresponding to a first accumulation period may be transferred to an input node having a first capacitance value, and a signal corresponding to the second accumulation period longer than the first accumulation period may be transferred to an input node having a second capacitance value higher than the first capacitance value, like the first embodiment. In this case, the imaging apparatus according to this embodiment can provide the same effect as that of the first embodiment.

Eighth Embodiment

An imaging apparatus according to this embodiment will be described with focus of differences from the sixth embodiment mainly.

Figure 13:
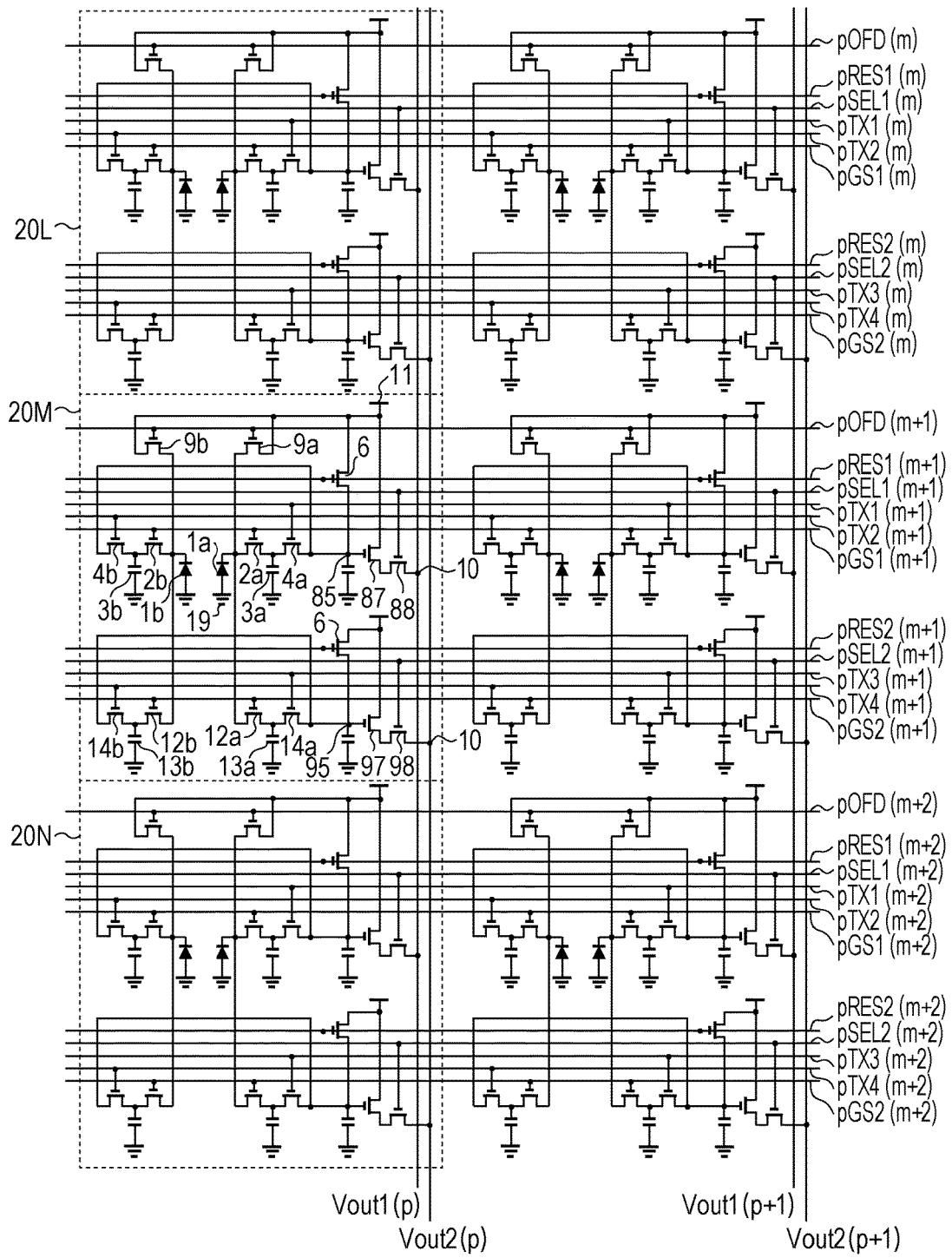
FIG. 13 illustrates a configuration of unit cells.

FIG. 13 illustrates a configuration of unit cells 20 in the imaging apparatus according to this embodiment. The imaging apparatus according to this embodiment has unit cells 20L, 20M, and 20N. Each of the unit cells 20L, 20M, and 20N has a plurality of photodiodes 1*a* and 1*b*. Each of the unit cells 20L, 20M, and 20N has first transfer switches 2*a* and 2*b*. Each of the unit cells 20L, 20M, and 20N has second transfer switches 4*a* and 4*b*. Each of the unit cells 20L, 20M, and 20N has third transfer switches 12*a* and 12*b*. Each of the unit cells 20L, 20M, and 20N has fourth transfer switches 14*a* and 14*b*. Each of the unit cells 20L, 20M, and 20N further has first capacitor elements 3a and 3b. Each of the unit cells 20L, 20M, and 20N further has second capacitor elements 13a and 13b. Each of the unit cells 20L, 20M, and 20N further has an amplifying unit 87 having an input node 85 and an amplifying unit 97 having an input node 95. Each of the unit cells 20L, 20M, and 20N further has selection switches 88 and 98.

This embodiment is different from the imaging apparatus according to the sixth embodiment in that two groups are provided each corresponding to one unit cell 20 having a photoelectric converting unit, a first transfer unit, a second transfer unit, a third transfer unit, a fourth transfer unit, a first signal holding unit, a second signal holding unit, and an amplifying unit. One microlens, not illustrated, is provided for one unit cell. Thus, light passing through the one microlens enters to the photodiodes 1a and 1b.

The signal pGS1(m) is input from the vertical scanning circuit 101 to the first transfer switches 2a and 2b. The signal pTX(m) is input from the vertical scanning circuit 101 to the second transfer switches 4a and 4b. The signal pGS2(m) is input from the vertical scanning circuit 101 to the third transfer switches 12a and 12b. The signal pTX2(m) is input from the vertical scanning circuit 101 to the fourth transfer switches 14a and 14b. The signal pSEL1(m) is input from the vertical scanning circuit 101 to the selection switch 88. The signal pSEL2(m) is input from the vertical scanning circuit 101 to the selection switch 98.

Also in this example, the input node 85 may have a different capacitance value from the capacitance value of the input node 95. Therefore, the same effect can be provided as that of the imaging apparatus of the sixth embodiment.

Ninth Embodiment

A ninth embodiment relates to an imaging system having an imaging apparatus according to the aforementioned embodiments.

Figure 14:
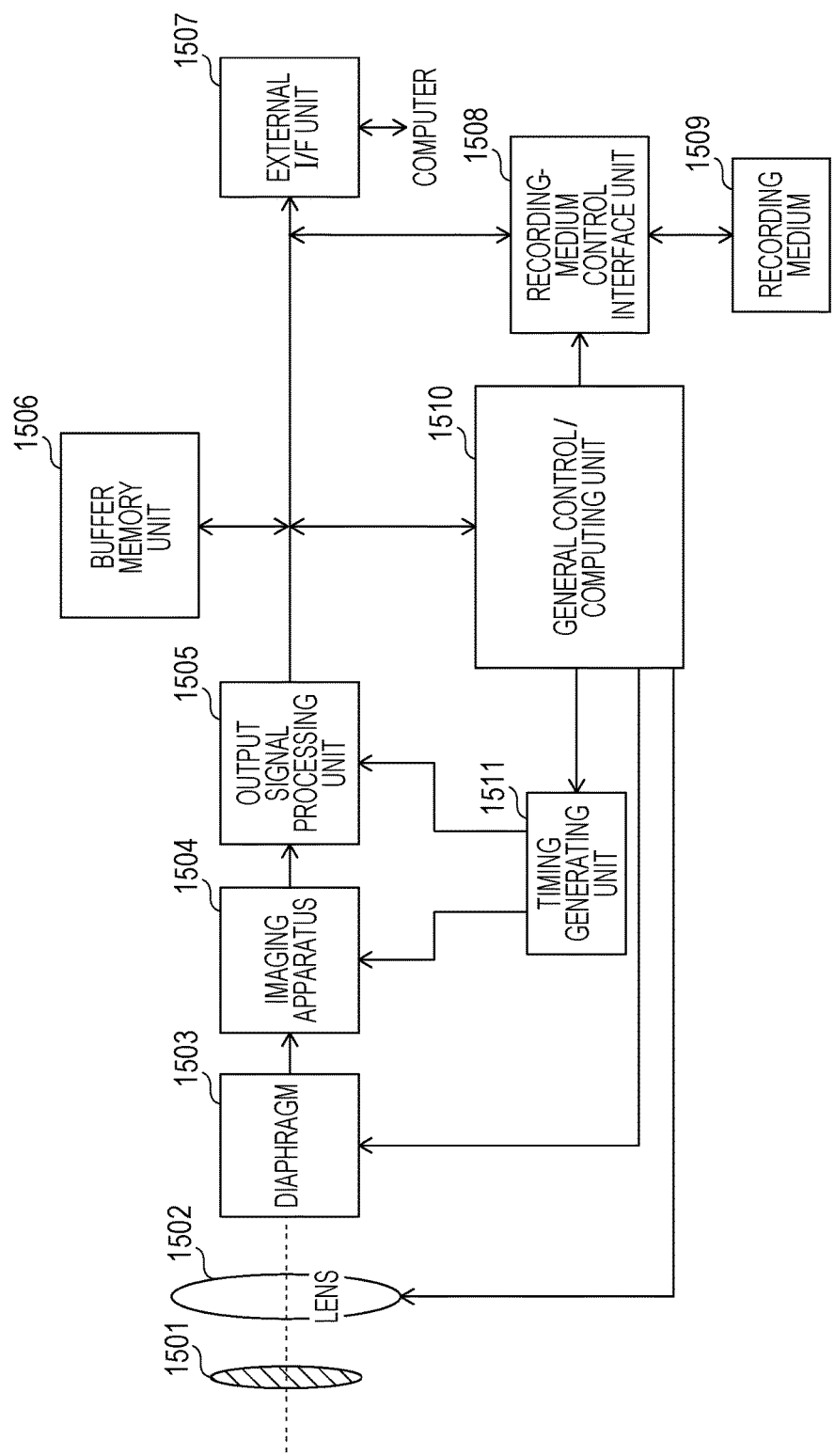
FIG. 14 illustrates a configuration of an imaging system.

The imaging system may be a digital still camera, a digital camcorder, or a surveillance camera. FIG. 14 is a schematic view of a digital still camera to which the imaging apparatus is applied as an example of the imaging system.

The imaging system illustrated in FIG. 14 has a barrier 1501 configured to protect a lens, a lens 1502 configured to focus an optical image of an object to an imaging apparatus 1504, and a diaphragm 1503 configured to adjust an amount of light passing through the lens 1502. The lens 1502 and the diaphragm 1503 are included in an optical system configured to gather light to the imaging apparatus 1504. The imaging system illustrated in FIG. 14 has an output signal processing unit 1505 configured to process an output signal from the imaging apparatus 1504. The output signal processing unit 1505 performs operations for performing correction and compression processes as required and output resulting signals.

The imaging system illustrated in FIG. 14 further has a buffer memory unit 1506 for temporarily storing image data and an external interface unit 1507 for communication with an external computer, for example. The imaging system further has a detachably mountable recording medium 1509, such as a semiconductor memory, configured to record or read out imaging data and a recording-medium control interface unit 1508 configured for performing recording or readout operations on the recording medium 1509. The imaging system further has a general control/computing unit 1510 configured to generally control computing and the digital still camera and a timing generating unit 1511 configured to output timing signals to the imaging apparatus 1504 and the output signal processing unit 1505. Here, timing signals may be externally input, and the imaging system may include at least the imaging apparatus 1504 and the output signal processing unit 1505 configured to process an output signal from the imaging apparatus 1504.

In a case where the imaging apparatus 1504 is the imaging apparatus according to the eighth embodiment, the output signal processing unit 1505 uses a signal corresponding to a signal accumulated in a photodiode 1a and a signal corresponding to a signal accumulated in a photodiode 1b to detect a de-focusing amount according to a phase difference detection method. The general control/computing unit 1510 can use the detected de-focusing amount to perform an operation for driving the optical system to focus on an object.

The output signal processing unit 1505 is provided on a second semiconductor substrate that is different from a first semiconductor substrate having thereon the imaging apparatus 1504. The first semiconductor substrate and the second semiconductor substrate may be separate chips or may be stacked into one chip.

The imaging system according to this embodiment, the imaging apparatus 1504 may be applied to perform an imaging operation.

Tenth Embodiment

Figure 15A:
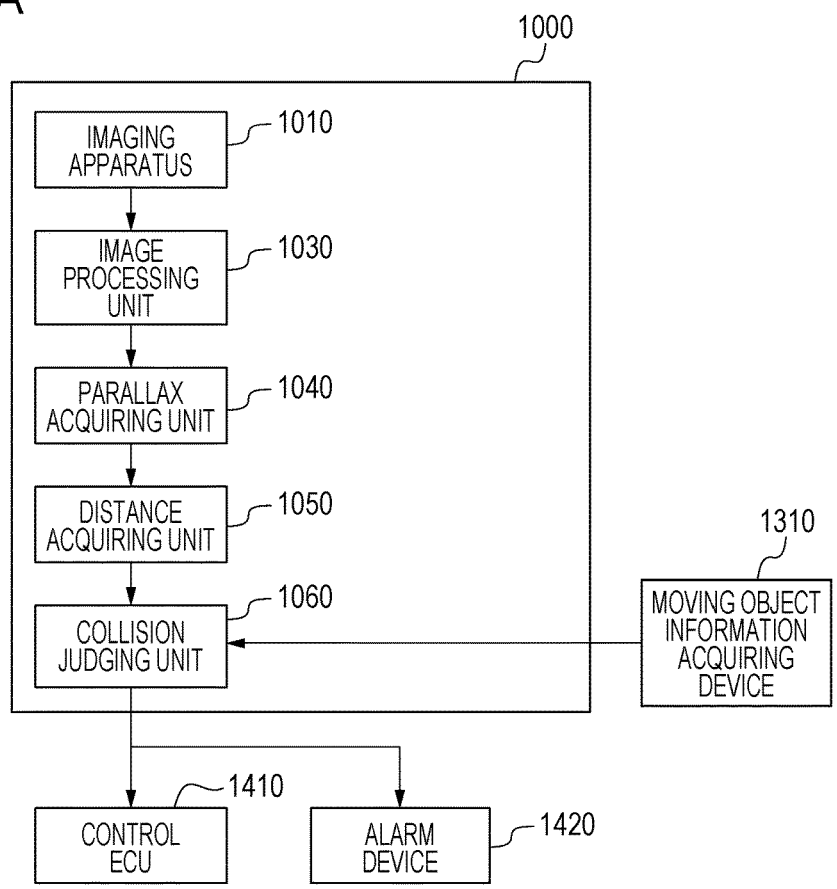
FIGS. 15A and 15B illustrate a configuration of the imaging system.
Figure 15B:
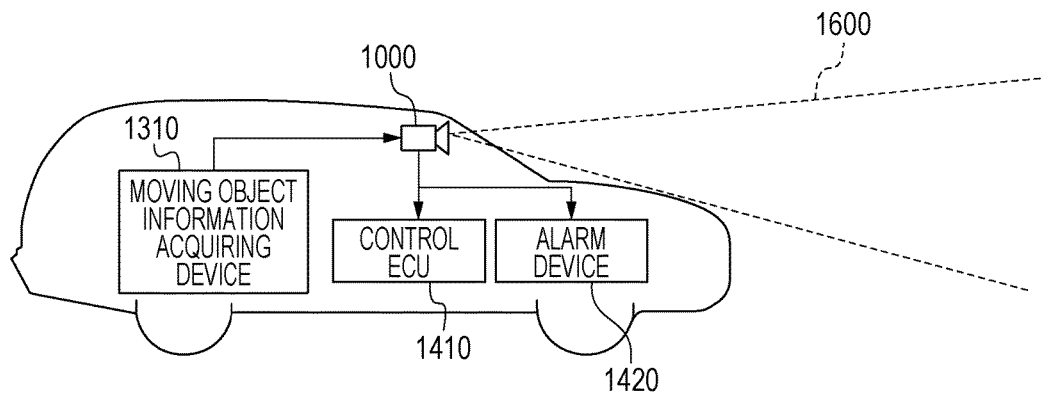

FIGS. 15A and 15B illustrate configurations of an imaging system 1000 according to a tenth embodiment and a moving object. FIG. 15A illustrates an example of the imaging system 1000 relating to a vehicle-mounted camera. The imaging system 1000 has an imaging apparatus 1010. The imaging apparatus 1010 may be one of the imaging apparatuses according to the aforementioned embodiments. The imaging system 1000 has an image processing unit 1030 configured to perform image processing on a plurality of image data sets acquired by the imaging apparatus 1010 and a parallax acquiring unit 1040 configured to calculate a parallax (phase difference of parallax images) from a plurality of image data sets acquired by the imaging system 1000. The imaging system 1000 further has a distance acquiring unit 1050 configured to calculate a distance to a target object on the basis of the calculated parallax and a collision judging unit 1060 configured to judge whether there is a possibility of occurrence of a collision on the basis of the calculated distance. Here, the parallax acquiring unit 1040 and the distance acquiring unit 1050 are examples of a distance information acquiring unit configured to acquire distance information to a target object. In other words, the distance information is information regarding a parallax, a de-focusing amount, a distance to a target object, or the like. The collision judging unit 1060 may judge a possibility of collision by using one of those kinds of distance information. The distance information acquiring unit may be implemented by specially designed hardware or by a software module. The distance information acquiring unit may be implemented by FPGA (Field Programmable Gate Array) or ASIC (Application Specific Integrated circuit), for example, or may be implemented by a combination thereof.

The imaging system 1000 is connected to the vehicle information acquiring device 1310 so that vehicle information such as a vehicle speed, a yaw velocity, and the helm position may be acquired. A control ECU 1410 is connected to the imaging system 1000. The control ECU 1410 is a control device configured to output a control signal for generating a braking force to a vehicle on the basis of a judgment result produced by the collision judging unit 1060.

In other words, the control ECU 1410 is an example of a moving object control unit configured to control a moving object on the basis of distance information. The imaging system 1000 is also connected to an alarm device 1420 configured to alert a driver on the basis of a judgment result produced by the collision judging unit 1060. For example, in a case where, as a judgment result, the collision judging unit 1060 judges that there is a high possibility of collision, the control ECU 1410 performs vehicle control for avoiding a collision and reducing damages by braking, releasing the accelerator pedal, or inhibiting engine outputs, for example. The alarm device 1420 may alert a user by outputting an audio alarm, displaying alert information on a screen of a car navigation system, or vibrating a sheet belt or a steering wheel, for example.

According to this embodiment, a surrounding area such as a front side or a back side of a vehicle is imaged by the imaging system 1000. FIG. 15B illustrates the imaging system 1000 in a case where a front side (imaging range 1600) of a vehicle is to be imaged. The vehicle information acquiring device 1310 transmits an instruction to cause the imaging system 1000 to operate and execute imaging. The imaging apparatus according to any one of the aforementioned embodiments may be used as the imaging apparatus 1010 so that the imaging system 1000 according to this embodiment can have improved precision of focusing.

Having described that the control for preventing a collision against other vehicles, this embodiment is also applicable to control for implementing automatic driving by following another vehicle and control for implementing automatic driving by keeping the vehicle within a traffic lane. Furthermore, the imaging system is also applicable to a moving object (or a moving device) such as a ship, an airplane, or an industrial robot, without limiting to the vehicle on which the imaging system is mounted. In addition, the imaging system is applicable to an apparatus using an object recognition function widely, such as Intelligent Transport Systems (ITS), without limiting to a moving object.

The aforementioned embodiments are merely given for illustration of concrete examples for implementing the present invention, and it should not be understood that the technical scope of the present invention is interpreted limitedly. In other words, the present invention may be implemented in various forms without departing from the technical spirit and scope or principal features thereof. The aforementioned embodiments may be implemented in various combinations.

According to the present invention, the dynamic range of an image in an imaging apparatus supporting a global electronic shutter function can be extended.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-112839 filed Jun. 6, 2016, which is hereby incorporated by reference herein in its entirety.

What is claimed is:

1. An imaging apparatus comprising:
a cell array having a plurality of groups arranged across a plurality of rows and a plurality of columns, each of the groups including a photoelectric converting unit, a signal holding unit, an amplifying unit having an input node, a first transfer unit having an electrical path between the photoelectric converting unit and the signal holding unit, and a second transfer unit having an electrical path between the signal holding unit and the input node; and
a control unit configured to control the plurality of groups,
wherein the control unit is configured to synchronize the plurality of groups to start and to complete a transfer of a signal from the photoelectric converting unit to the signal holding unit performed by the first transfer unit;
wherein the photoelectric converting unit is configured to accumulate a signal during a first accumulation period and during a second accumulation period other than the first accumulation period and longer than the first accumulation period, and
wherein at least one of the plurality of groups further has a capacitance changing unit configured to change a capacitance value of the input node therein.

2. The imaging apparatus according to claim 1,
wherein a first group of the plurality of groups has the capacitance changing unit; and
the second transfer unit in a second group of the plurality of groups and the input node and the capacitance changing unit in the first group are connected.

3. The imaging apparatus according to claim 2,
wherein the photoelectric converting unit is configured to accumulate a signal during a first accumulation period and during a second accumulation period different from the first accumulation period and longer than the first accumulation period;
wherein, in response to a change of the input node to have a first capacitance value performed by the capacitance changing unit, a signal corresponding to the first accumulation period is transferred from the second transfer unit to the input node; and
wherein, in response to a change of the input node to have a second capacitance value higher than the first capacitance value performed by the capacitance changing unit, a signal corresponding to the second accumulation period is transferred from the second transfer unit to the input node.

4. The imaging apparatus according to claim 2,
wherein, in response to a change of the input node to have a first capacitance value performed by the capacitance changing unit, a signal corresponding to the first accumulation period is transferred from the second transfer unit to the input node; and
wherein, in response to a change of the input node to have a second capacitance value lower than the first capacitance value performed by the capacitance changing unit, a signal corresponding to the second accumulation period is transferred from the second transfer unit to the input node.

5. The imaging apparatus according to claim 4,
wherein each of the plurality of groups further includes a second signal holding unit; and
a third transfer unit provided on an electrical path between the photoelectric converting unit and the second signal holding unit and a fourth transfer unit provided on an electrical path between the second signal holding unit and the input node;
wherein a signal accumulated in the first accumulation period by the photoelectric converting unit is transferred to the signal holding unit through the first transfer unit; and wherein a signal accumulated in the second accumulation period by the photoelectric converting unit is transferred to the second signal holding unit through the third transfer unit.

6. An imaging apparatus comprising:
a cell array having a plurality of groups arranged across a plurality of rows and a plurality of columns, each of the groups including a photoelectric converting unit, a signal holding unit, a first amplifying unit having a first input node having a first capacitance value, a second amplifying unit having a second input node having a second capacitance value higher than the first capacitance value, a first transfer unit provided on an electrical path between the photoelectric converting unit and the signal holding unit, a second transfer unit provided on an electrical path between the signal holding unit and the first input node, and a third transfer unit provided on an electrical path between the signal holding unit and the second input node; and
a control unit configured to control the photoelectric converting unit to accumulate a signal during a first accumulation period and during a second accumulation period other than the first accumulation period and longer than the first accumulation period, and further configured to synchronize the plurality of groups to start and to complete a transfer of a signal from the photoelectric converting unit to the signal holding unit performed by the first transfer unit.

7. The imaging apparatus according to claim 6,
wherein a signal corresponding to the first accumulation period is transferred to the first input node; and
wherein a signal corresponding to the second accumulation period is transferred to the second input node.

8. The imaging apparatus according to claim 6,
wherein a signal corresponding to the second accumulation period is transferred to the first input node; and
wherein a signal corresponding to the first accumulation period is transferred to the second input node.

9. The imaging apparatus according to claim 6,
wherein each of the plurality of groups further includes a capacitance changing unit connected to the second input node; and
wherein the capacitance changing unit selects the second capacitance value from a plurality of capacitance values including the second capacitance value so that the second input node can have the second capacitance value.

10. The imaging apparatus according to claim 6,
wherein each of the plurality of groups further includes a capacitance changing unit connected to the second input node;
wherein each of the first input node and the second input node has a floating diffusion unit formed by diffusing an impurity into a silicon semiconductor layer;
wherein the floating diffusion unit in the first input node and the floating diffusion unit in the second input node have an equal capacitance value; and
wherein the capacitance changing unit connects the floating diffusion unit in the second input node to another capacitance so that the second input node can have the second capacitance value.

11. The imaging apparatus according to claim 6,
wherein each of the first input node and the second input node has a floating diffusion unit formed by diffusing an impurity into a silicon semiconductor layer; and
wherein a difference between the first capacitance value and the second capacitance value is equal to a difference between a capacitance value of the floating diffusion unit in the first input node and a capacitance value of the floating diffusion unit in the second input node.

12. An imaging apparatus comprising a cell array having a plurality of groups arranged across a plurality of rows and a plurality of columns, each of the groups including
a photoelectric converting unit;
a signal holding unit;
an amplifying unit having an input node;
a first transfer unit provided on an electrical path between the photoelectric converting unit and the signal holding unit;
a second transfer unit;
a second signal holding unit;
a third transfer unit provided on an electrical path between the photoelectric converting unit and the second signal holding unit, and a fourth transfer unit,
wherein the first transfer unit completes a transfer of a signal from the photoelectric converting unit to the signal holding unit at an equal time point in the plurality of groups;
wherein the input node of a first group of the plurality of groups has a first capacitance value;
wherein the input node of a second group of the plurality of groups has a second capacitance value higher than the first capacitance value;
wherein the second transfer unit in the first group and the second transfer unit in the second group are connected to the input node of one of the first group and the second group; and
wherein the fourth transfer unit in the first group and the fourth transfer unit in the second group are connected to the input node of the other one of the first group and the second group.

13. The imaging apparatus according to claim 12,
wherein the photoelectric converting unit accumulates a signal in a first accumulation period and a second accumulation period different from the first accumulation period and longer than the first accumulation period;
signals corresponding to the first accumulation period are sequentially input from the second transfer unit in the first group and the second transfer unit in the second group to the input node of one of the first group and the second group;
wherein signals corresponding to the second accumulation period are sequentially input from the second transfer unit in the first group and the second transfer unit in the second group to the input node of the other one of the first group and the second group.

14. The imaging apparatus according to claim 12,
wherein the photoelectric converting unit accumulates a signal in a first accumulation period and a second accumulation period different from the first accumulation period and longer than the first accumulation period;
wherein signals corresponding to the second accumulation period are sequentially input from the second transfer unit in the first group and the second transfer unit in the second group to the input node of one of the first group and the second group; and
wherein signals corresponding to the first accumulation period are sequentially input from the second transfer unit in the first group and the second transfer unit in the second group to the input node of the other one of the first group and the second group.

15. The imaging apparatus according to claim 12,
wherein the plurality of groups includes a third group, and the input node of the third group has the second capacitance value;
wherein the second transfer unit in the first group and the second transfer unit in the second group are connected to the input node in the first group;
wherein the fourth transfer unit in the first group and the fourth transfer unit in the third group are connected to the input node in the third group; and
wherein the second group, the first group, and the third group are arranged in order without any other group therebetween.

16. The imaging apparatus according to claim 1,
wherein the cell array has a plurality of unit cells arranged across a plurality of rows and a plurality of columns, and each of the unit cells has the plurality of groups; and
wherein one microlens is provided correspondingly for each of the plurality of unit cells.

17. An imaging system comprising:
the imaging apparatus according to claim 1; and
a signal processing unit configured to generate an image by processing a signal output from the imaging apparatus.

18. An imaging system comprising:
the imaging apparatus according to claim 6; and
a signal processing unit configured to generate an image by processing a signal output from the imaging apparatus.

19. An imaging system comprising:
the imaging apparatus according to claim 12; and
a signal processing unit configured to generate an image by processing a signal output from the imaging apparatus.

20. A moving object comprising:
the imaging apparatus according to claim 1;
a distance information acquiring unit configured to acquire distance information regarding a target object from a parallax image based on a signal from the imaging apparatus; and
a moving object control unit configured to control the moving object on the basis of the distance information.

* * * * *